United States Patent
Liu et al.

(10) Patent No.: US 11,910,359 B2
(45) Date of Patent: Feb. 20, 2024

(54) TECHNIQUES FOR CONTROL RESOURCE POOL-GATED DATA TRANSMISSION

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Junyi Li, Fairless Hills, PA (US); Piyush Gupta, Bridgewater, NJ (US); Ozcan Ozturk, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/484,117

(22) Filed: Sep. 24, 2021

(65) Prior Publication Data

US 2023/0101632 A1     Mar. 30, 2023

(51) Int. Cl.
*H04W 72/02* (2009.01)
*H04L 1/1867* (2023.01)
*H04W 72/0453* (2023.01)
*H04W 24/08* (2009.01)
*H04W 72/0446* (2023.01)
*H04W 72/20* (2023.01)

(52) U.S. Cl.
CPC .......... *H04W 72/02* (2013.01); *H04L 1/1896* (2013.01); *H04W 24/08* (2013.01); *H04W 72/0446* (2013.01); *H04W 72/0453* (2013.01); *H04W 72/20* (2023.01)

(58) Field of Classification Search
CPC . H04W 72/02; H04W 24/08; H04W 72/0446; H04W 72/0453; H04W 72/20; H04W 92/18; H04W 76/23; H04W 72/25; H04W 4/44; H04W 72/53; H04W 24/10; H04L 1/1896; H04L 5/0078; H04L 5/0055; H04L 1/1854; H04L 1/1887; H04L 5/0044; H04L 5/00; H04J 11/0036
See application file for complete search history.

(56) References Cited

U.S. PATENT DOCUMENTS

2019/0007974 A1*  1/2019  Nguyen .............. H04W 4/44
2020/0260472 A1*  8/2020  Ganesan ............. H04W 72/20

(Continued)

*Primary Examiner* — Vinncelas Louis
(74) *Attorney, Agent, or Firm* — Holland & Hart LLP

(57) ABSTRACT

Methods, systems, and devices for wireless communications are described. A user equipment (UE) may transmit a first sidelink control information (SCI) message during a mini-slot of a control resource pool which is decoupled from a data resource pool for sidelink communications. The first SCI message may indicate a data message to be transmitted on a subchannel of the data resource pool to a second UE, where resources between the control resource pool and the data resource pool are mapped. The UE may receive a feedback message from the second UE for the first SCI message during a second mini-slot of the control resource pool. The feedback message may indicate whether a collision or strong interference was detected for the first SCI message. The UE may determine whether to transmit the data message or retransmit the first SCI message based on the feedback message.

28 Claims, 15 Drawing Sheets

(56) References Cited

U.S. PATENT DOCUMENTS

| | | | |
|---|---|---|---|
| 2020/0304159 A1* | 9/2020 | Liao | H04J 11/0036 |
| 2021/0243762 A1* | 8/2021 | Selvanesan | H04W 72/53 |
| 2022/0201528 A1* | 6/2022 | Shin | H04W 24/10 |
| 2022/0272682 A1* | 8/2022 | Hahn | H04L 5/00 |

* cited by examiner

TECHNIQUES FOR CONTROL RESOURCE POOL-GATED DATA TRANSMISSION

FIELD OF TECHNOLOGY

The following relates to wireless communications, including techniques for control resource pool-gated data transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In a wireless communications system implementing sidelink communications, a UE may send sidelink control information (SCI) to schedule sidelink shared channel resources for a sidelink data transmission. In some cases, two UEs may reserve a same sidelink shared channel resource, which may result in colliding sidelink transmissions. Collision on sidelink shared channel resources may lead to delays and significant overhead to reschedule the sidelink shared channel transmissions.

SUMMARY

The described techniques relate to improved methods, systems, devices, and apparatuses that support techniques for control resource pool-gated data transmission. Generally, the described techniques provide for utilizing a control resource pool which is decoupled from a data resource pool to sense resource collisions and gate, or stop, data transmissions which may result in a collision in the data resource pool. For example, a first user equipment (UE) may transmit a first sidelink control information (SCI) message during a mini-slot of the control resource pool. The first SCI message may indicate a data message to be transmitted on a subchannel of the data resource pool to a second UE. Resources between the control resource pool and the data resource pool may be mapped, such that if there is a collision in the control resource pool, it may correspond to a resource collision in the data resource pool. The first UE may receive a feedback message from the second UE for the first SCI message during a second mini-slot of the control resource pool. The feedback message may indicate whether a collision or strong interference was detected for the first SCI message. The first UE may determine whether to transmit the data message or retransmit the first SCI message based on the feedback message.

A method for wireless communications at a first UE is described. The method may include transmitting a first SCI message during a first transmission time interval of a first resource pool, the first SCI message indicating a data message to be transmitted on a subchannel of a second resource pool to a second UE, receiving a feedback message from the second UE for the first SCI message during a second transmission time interval of the first resource pool, and determining whether to transmit the data message on the subchannel of the second resource pool based on the feedback message received from the second UE.

An apparatus for wireless communications at a first UE is described. The apparatus may include a processor, memory coupled with the processor, and instructions stored in the memory. The instructions may be executable by the processor to cause the apparatus to transmit a first SCI message during a first transmission time interval of a first resource pool, the first SCI message indicating a data message to be transmitted on a subchannel of a second resource pool to a second UE, receive a feedback message from the second UE for the first SCI message during a second transmission time interval of the first resource pool, and determine whether to transmit the data message on the subchannel of the second resource pool based on the feedback message received from the second UE.

Another apparatus for wireless communications at a first UE is described. The apparatus may include means for transmitting a first SCI message during a first transmission time interval of a first resource pool, the first SCI message indicating a data message to be transmitted on a subchannel of a second resource pool to a second UE, means for receiving a feedback message from the second UE for the first SCI message during a second transmission time interval of the first resource pool, and means for determining whether to transmit the data message on the subchannel of the second resource pool based on the feedback message received from the second UE.

A non-transitory computer-readable medium storing code for wireless communications at a first UE is described. The code may include instructions executable by a processor to transmit a first SCI message during a first transmission time interval of a first resource pool, the first SCI message indicating a data message to be transmitted on a subchannel of a second resource pool to a second UE, receive a feedback message from the second UE for the first SCI message during a second transmission time interval of the first resource pool, and determine whether to transmit the data message on the subchannel of the second resource pool based on the feedback message received from the second UE.

In some examples of the method, apparatuses, and non-transitory computer-readable medium described herein, determining whether to transmit the data message may include operations, features, means, or instructions for transmitting the data message on the subchannel of the second resource pool based on the feedback message indicating an acknowledgment for the first SCI message.

In some examples of the method, apparatuses, and non-transitory computer-readable medium described herein, determining whether to transmit the data message may include operations, features, means, or instructions for reserving, based on transmitting the first SCI message, a third transmission time interval of the first resource pool, transmitting a retransmission of the first SCI message during the third transmission time interval of the first resource pool based on the feedback message indicating a negative acknowledgment, the retransmission of the first SCI message indicating the data message to be transmitted on a second subchannel of the second resource pool the second UE, receiving a second feedback message from the second UE during a fourth transmission time interval of the first resource pool, the second feedback message indicating an acknowledgment for the retransmission of the first SCI message, and transmitting the data message on the second subchannel of the second resource pool based on the second feedback message.

Some examples of the method, apparatuses, and non-transitory computer-readable medium described herein may further include operations, features, means, or instructions for transmitting a second SCI message during the first transmission time interval of the first resource pool, where the first SCI message may be of a first type and the second SCI message may be of a second type.

In some examples of the method, apparatuses, and non-transitory computer-readable medium described herein, the first SCI message includes a source identifier or a destination identifier, or both.

In some examples of the method, apparatuses, and non-transitory computer-readable medium described herein, the second SCI message includes a destination identifier, a transmission configuration indicator state for the data message, a channel state information triggering state field, or any combination thereof.

Some examples of the method, apparatuses, and non-transitory computer-readable medium described herein may further include operations, features, means, or instructions for scrambling a demodulation reference signal included in the second SCI message using a source identifier.

In some examples of the method, apparatuses, and non-transitory computer-readable medium described herein, the first resource pool and the second resource pool may be time division multiplexed or frequency division multiplexed, or both.

Some examples of the method, apparatuses, and non-transitory computer-readable medium described herein may further include operations, features, means, or instructions for receiving an indication of a mapping between the first resource pool and the second resource pool based on a first subcarrier spacing for the first resource pool and a second subcarrier spacing for the second resource pool.

In some examples of the method, apparatuses, and non-transitory computer-readable medium described herein, a first slot of the subchannel of the second resource pool maps to a first subchannel of the first transmission time interval of the first resource pool, and a second slot of the subchannel of the second resource pool maps to a second subchannel of the first transmission time interval of the first resource pool.

In some examples of the method, apparatuses, and non-transitory computer-readable medium described herein, a first slot of the subchannel of the second resource pool maps to a subchannel of the first transmission time interval of the first resource pool, and a second slot of the subchannel of the second resource pool maps to the subchannel of the second transmission time interval of the first resource pool.

In some examples of the method, apparatuses, and non-transitory computer-readable medium described herein, receiving the feedback message may include operations, features, means, or instructions for receiving the feedback message in a first portion of the first resource pool configured for feedback signaling which may be frequency division multiplexed with a second portion of the first resource pool configured for SCI signaling.

In some examples of the method, apparatuses, and non-transitory computer-readable medium described herein, receiving the feedback message may include operations, features, means, or instructions for receiving the feedback message in a first portion of the first resource pool configured for feedback signaling which may be time division multiplexed with a second portion of the first resource pool configured for SCI signaling.

A method for wireless communications at a second UE is described. The method may include receiving, from a first UE, a first SCI message during a first transmission time interval of a first resource pool, the first SCI message indicating a data message to be transmitted by the first UE on a subchannel of a second resource pool, transmitting a feedback message to the first UE for the first SCI message during a second transmission time interval of the first resource pool, and determining whether to monitor for the data message on the subchannel of the second resource pool based on the feedback message.

An apparatus for wireless communications at a second UE is described. The apparatus may include a processor, memory coupled with the processor, and instructions stored in the memory. The instructions may be executable by the processor to cause the apparatus to receive, from a first UE, a first SCI message during a first transmission time interval of a first resource pool, the first SCI message indicating a data message to be transmitted by the first UE on a subchannel of a second resource pool, transmit a feedback message to the first UE for the first SCI message during a second transmission time interval of the first resource pool, and determine whether to monitor for the data message on the subchannel of the second resource pool based on the feedback message.

Another apparatus for wireless communications at a second UE is described. The apparatus may include means for receiving, from a first UE, a first SCI message during a first transmission time interval of a first resource pool, the first SCI message indicating a data message to be transmitted by the first UE on a subchannel of a second resource pool, means for transmitting a feedback message to the first UE for the first SCI message during a second transmission time interval of the first resource pool, and means for determining whether to monitor for the data message on the subchannel of the second resource pool based on the feedback message.

A non-transitory computer-readable medium storing code for wireless communications at a second UE is described. The code may include instructions executable by a processor to receive, from a first UE, a first SCI message during a first transmission time interval of a first resource pool, the first SCI message indicating a data message to be transmitted by the first UE on a subchannel of a second resource pool, transmit a feedback message to the first UE for the first SCI message during a second transmission time interval of the first resource pool, and determine whether to monitor for the data message on the subchannel of the second resource pool based on the feedback message.

In some examples of the method, apparatuses, and non-transitory computer-readable medium described herein, determining whether to monitor for the data message may include operations, features, means, or instructions for receiving the data message on the subchannel of the second resource pool based on the feedback message indicating an acknowledgment for the first SCI message.

In some examples of the method, apparatuses, and non-transitory computer-readable medium described herein, determining whether to monitor for the data message may include operations, features, means, or instructions for identifying a third transmission time interval of the first resource pool reserved by the first SCI message, receiving a retransmission of the first SCI message during the third transmission time interval of the first resource pool based on the feedback message indicating a negative acknowledgment, the retransmission of the first SCI message indicating the data message from the first UE on a second subchannel of the second resource pool, transmitting a second feedback message to the first UE during a fourth transmission time interval of the first resource pool, the second feedback message indicating an acknowledgment for the retransmission of the first SCI message, and receiving the data message on the second subchannel of the second resource pool based on the second feedback message.

Some examples of the method, apparatuses, and non-transitory computer-readable medium described herein may further include operations, features, means, or instructions for measuring a first reference signal received power associated with the first resource pool based on the first SCI message and determining a second reference signal received power associated with the second resource pool based on a mapping to the first reference signal received power.

Some examples of the method, apparatuses, and non-transitory computer-readable medium described herein may further include operations, features, means, or instructions for receiving a second SCI message during the first transmission time interval of the first resource pool, where the first SCI message may be of a first type and the second SCI message may be of a second type.

In some examples of the method, apparatuses, and non-transitory computer-readable medium described herein, the first SCI message includes a source identifier or a destination identifier, or both.

In some examples of the method, apparatuses, and non-transitory computer-readable medium described herein, the second SCI message includes a destination identifier, a transmission configuration indicator state for the data message, a channel state information triggering state field, or any combination thereof.

Some examples of the method, apparatuses, and non-transitory computer-readable medium described herein may further include operations, features, means, or instructions for descrambling a demodulation reference signal included in the second SCI message using a source identifier.

Some examples of the method, apparatuses, and non-transitory computer-readable medium described herein may further include operations, features, means, or instructions for estimating an interference level on the subchannel of the second resource pool based on the demodulation reference signal.

In some examples of the method, apparatuses, and non-transitory computer-readable medium described herein, the first resource pool and the second resource pool may be time division multiplexed or frequency division multiplexed, or both.

Some examples of the method, apparatuses, and non-transitory computer-readable medium described herein may further include operations, features, means, or instructions for receiving an indication of a mapping between the first resource pool and the second resource pool based on a first subcarrier spacing for the first resource pool and a second subcarrier spacing for the second resource pool.

In some examples of the method, apparatuses, and non-transitory computer-readable medium described herein, a first slot of the subchannel of the second resource pool maps to a first subchannel of the first transmission time interval of the first resource pool, and a second slot of the subchannel of the second resource pool maps to a second subchannel of the first transmission time interval of the first resource pool.

In some examples of the method, apparatuses, and non-transitory computer-readable medium described herein, a first slot of the subchannel of the second resource pool maps to a subchannel of the first transmission time interval of the first resource pool, and a second slot of the subchannel of the second resource pool maps to the subchannel of the second transmission time interval of the first resource pool.

In some examples of the method, apparatuses, and non-transitory computer-readable medium described herein, transmitting the feedback message may include operations, features, means, or instructions for transmitting the feedback message in a first portion of the first resource pool configured for feedback signaling which may be frequency division multiplexed with a second portion of the first resource pool configured for SCI signaling.

In some examples of the method, apparatuses, and non-transitory computer-readable medium described herein, transmitting the feedback message may include operations, features, means, or instructions for transmitting the feedback message in a first portion of the first resource pool configured for feedback signaling which may be time division multiplexed with a second portion of the first resource pool configured for SCI signaling.

DETAILED DESCRIPTION

Figure 1:
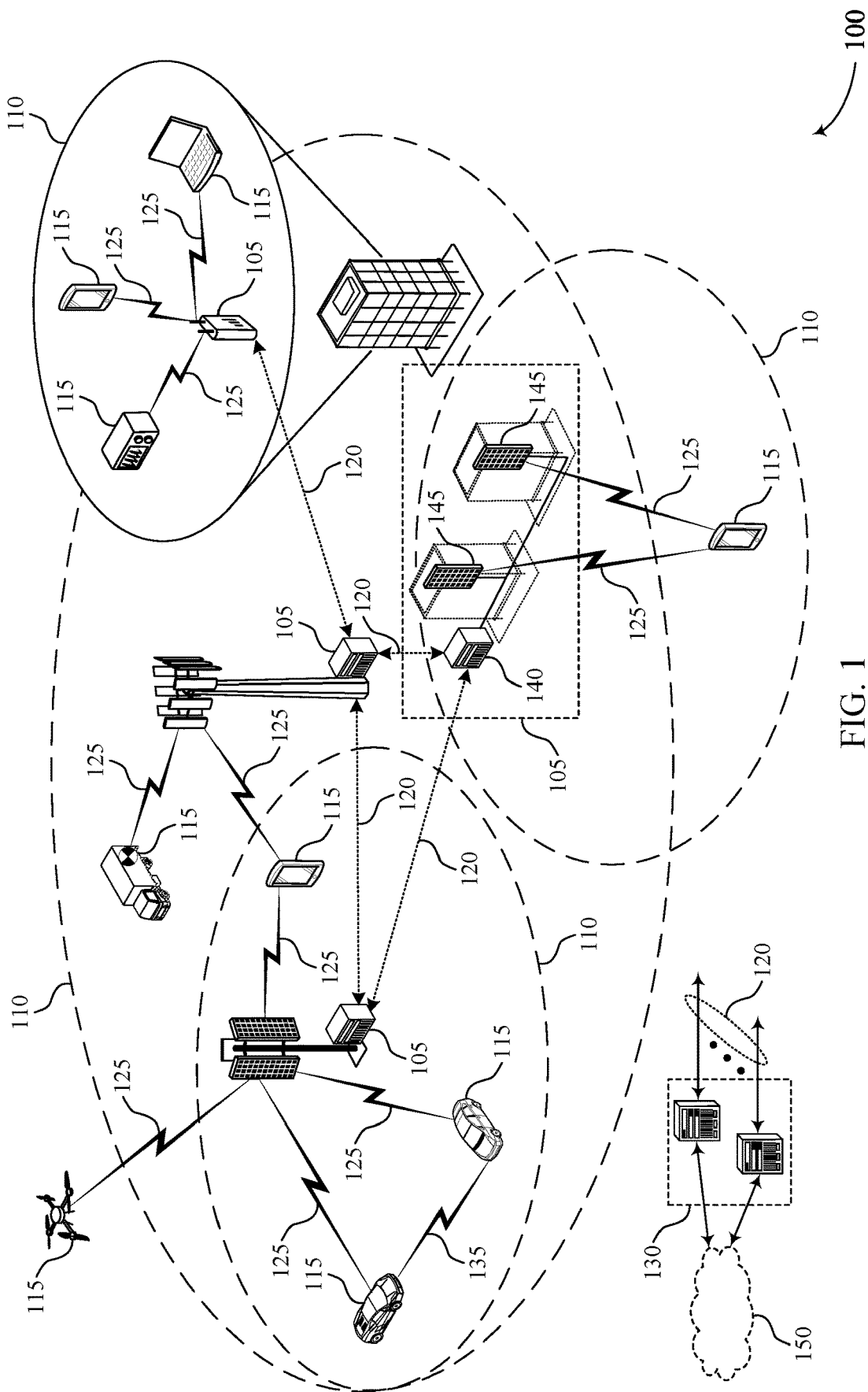
FIG. 1 illustrates an example of a wireless communications system that supports techniques for control resource pool-gated data transmission in accordance with aspects of the present disclosure.

In a wireless communications system supporting sidelink communications, a user equipment (UE) may transmit sidelink control information (SCI) to schedule resources for a sidelink data message on sidelink shared channel resources. Some systems may support cross-carrier scheduling for sidelink communications, where SCI transmitted in a first radio frequency spectrum band schedules sidelink data transmissions in a second radio frequency spectrum band. For example, SCI in a 6 gigahertz bandwidth may schedule a sidelink data message in a higher, millimeter wave bandwidth. Some of these systems may utilize decoupled control and data resource pools, where a mini-slot control resource pool is in a low radio frequency spectrum band, and a data resource pool is in a high radio frequency spectrum band. However, there may be significant delay if a collision occurs on the sidelink shared channel resources. For example, SCI transmitted in the control resource pool may schedule multiple data messages or multiple repetitions of a data message on multiple sidelink shared channel resources. If there is a collision (e.g., another UE transmits on some of the same resources), the transmitter may be supported to reschedule the data message only after transmitting the data message and receiving a negative acknowledgment for the data message. Therefore, in current systems, a transmitting UE may transmit the data message, the message may collide, and the transmitting UE may have to wait to reschedule the data message, which may introduce significant delay and overhead to reschedule the data message.

The present disclosure provides techniques for gating a data transmission on a data resource pool by monitoring a control resource pool for possible collisions and indicating the detected collisions prior to the transmission. Therefore, with a decoupled control and data resource pool allocation, a UE may gate the sidelink data transmission if the resource collision is detected ahead of time. For example, the control resource pool may include resources for sidelink feedback signaling. Each sidelink control channel resource in the control resource pool may correspond, or map, to a sidelink shared channel resource in the data resource pool. Therefore, if two UEs collide in the control resource pool (e.g., SCI transmissions from different transmitting UEs collide on a same sidelink control channel resource), these UEs may similarly be scheduled for a resource collision in the data resource pool. A receiving UE may detect the collision in the control resource pool and send a feedback message to one or more of the transmitting UEs to indicate the collision. A transmitting UE may receive the feedback message, gate or cancel the sidelink data transmission, and retransmit the SCI on another sidelink control channel resource to reschedule the sidelink data message. The transmitting UE may retransmit the SCI using another sidelink control channel resource which is reserved by the first (e.g., collided) SCI transmission.

Aspects of the disclosure are initially described in the context of wireless communications systems. Aspects of the disclosure are further illustrated by and described with reference to apparatus diagrams, system diagrams, and flowcharts that relate to techniques for control resource pool-gated data transmission.

FIG. 1 illustrates an example of a wireless communications system 100 that supports techniques for control resource pool-gated data transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications between devices such as UEs 115. To reserve resources for a sidelink transmission, a UE 115 may transmit SCI on physical sidelink control channel (PSCCH) resources. There may be multiple different types of SCI messages, such as first-stage SCI (e.g., SCI-1) and second-stage SCI (e.g., SCI-2). In SCI-1, a transmitter may reserve up to 3 retransmissions in a periodic pattern, where the pattern may be indicated in the SCI-1. For example, SCI-1 may be configured via RRC to reserve up to one or two additional slots within a range of the first SCI transmission (e.g., within 32 slots of the first SCI transmission).

In some cases, a node may be triggered to report available resources to an upper layer. Information on the available resources may be determined based on SCI-1 monitoring, considering which resources have been reserved and the priority of monitored SCI-1. For a monitored SCI-1, the node may reserve resources for the current up to three transmissions (e.g., the current transmission and up to two future resource reservations) and up to three resources in a next instance of the indicated period (e.g., if a non-zero period is indicated by the SCI-1). If the node cannot monitor due to a half-duplex constraint, the node may assume that there is an SCI-1 transmitted in the slot but cannot be detected due to the half-duplex constraint. In this example, the node may block the slots possibly indicated by all periods configured (e.g., up to 15 slots).

In some cases, the wireless communications system 100 may support cross-carrier scheduling for sidelink communications, where a UE 115 may transmit SCI in a first radio frequency spectrum band to schedule sidelink data transmissions in a second radio frequency spectrum band. For example, SCI in a 6 gigahertz bandwidth may schedule sidelink data message in a higher, millimeter wave bandwidth. The higher band may have large bandwidth suitable for physical sidelink shared channel (PSSCH) transmissions carrying high throughput data transmissions. In some cases, a UE 115 may transmit SCI-1 as a broadcast, indicating future reservations that other nodes (e.g., other UEs 115) may monitor.

Some of these systems may utilize decoupled control and data resource pools, where a mini-slot control resource pool is in a low radio frequency spectrum band, and a data resource pool is in a high radio frequency spectrum band. SCI-1 transmitted in mini-slots of the control resource pool may reduce the scheduling delay in the low band to match the PSSCH with the high band numerology. In some cases, physical sidelink feedback channel (PSFCH) resources may be included in the mini-slot structure and may be time division multiplexed or frequency division multiplexed with shortened PSSCH or shortened PSCCH resources (e.g., mini-slot PSSCH and mini-slot PSCCH resources). The PSFCH resources may be used to send an acknowledgment (ACK) or negative acknowledgment (NACK) for shortened PSSCH based on a mini-slot index and subchannels of the associated shortened PSSCH or an explicit resource index and K1 signaled in the shortened PSSCH scheduling SCI.

In some systems, there may be significant delay if a collision occurs on the sidelink shared channel resources. For example, SCI transmitted in the control resource pool may schedule multiple data messages or multiple repetitions of a data message on multiple sidelink shared channel resources. If there is a collision (e.g., another UE 115 transmits on some of the same resources), the transmitter may be supported to reschedule the data message only after transmitting the data message and receiving a negative acknowledgment for the data message. Therefore, in current systems, a transmitting UE 115 may transmit the data message, the message may collide, and the transmitting UE 115 may have to wait to reschedule the data message, which may introduce significant delay and overhead to reschedule the data message.

Wireless communications systems described herein, such as the wireless communications system 100, may implement techniques to gate a data transmission on a data resource pool by monitoring a control resource pool for possible collisions and indicating the detected collisions prior to the transmission. Therefore, with a decoupled control and data resource pool allocation, a UE 115 may gate the sidelink data transmission if the resource collision is detected ahead of time. For example, the control resource pool may include resources for sidelink feedback signaling. Each sidelink control channel resource in the control resource pool may correspond, or map, to a sidelink shared channel resource in the data resource pool.

Therefore, if two UEs 115 collide in the control resource pool (e.g., SCI transmissions from different transmitting UEs 115 collide on a same sidelink control channel resource), these UEs 115 may similarly be scheduled for a resource collision in the data resource pool. A receiving UE may detect the collision in the control resource pool and send a feedback message to one or more of the transmitting UEs 115 to indicate the collision. A transmitting UE 115 may receive the feedback message, gate or cancel the sidelink data transmission, and retransmit the SCI on another sidelink control channel resource to reschedule the sidelink data message. The transmitting UE 115 may retransmit the SCI using another sidelink control channel resource which is reserved by the first (e.g., collided) SCI transmission.

Figure 2:
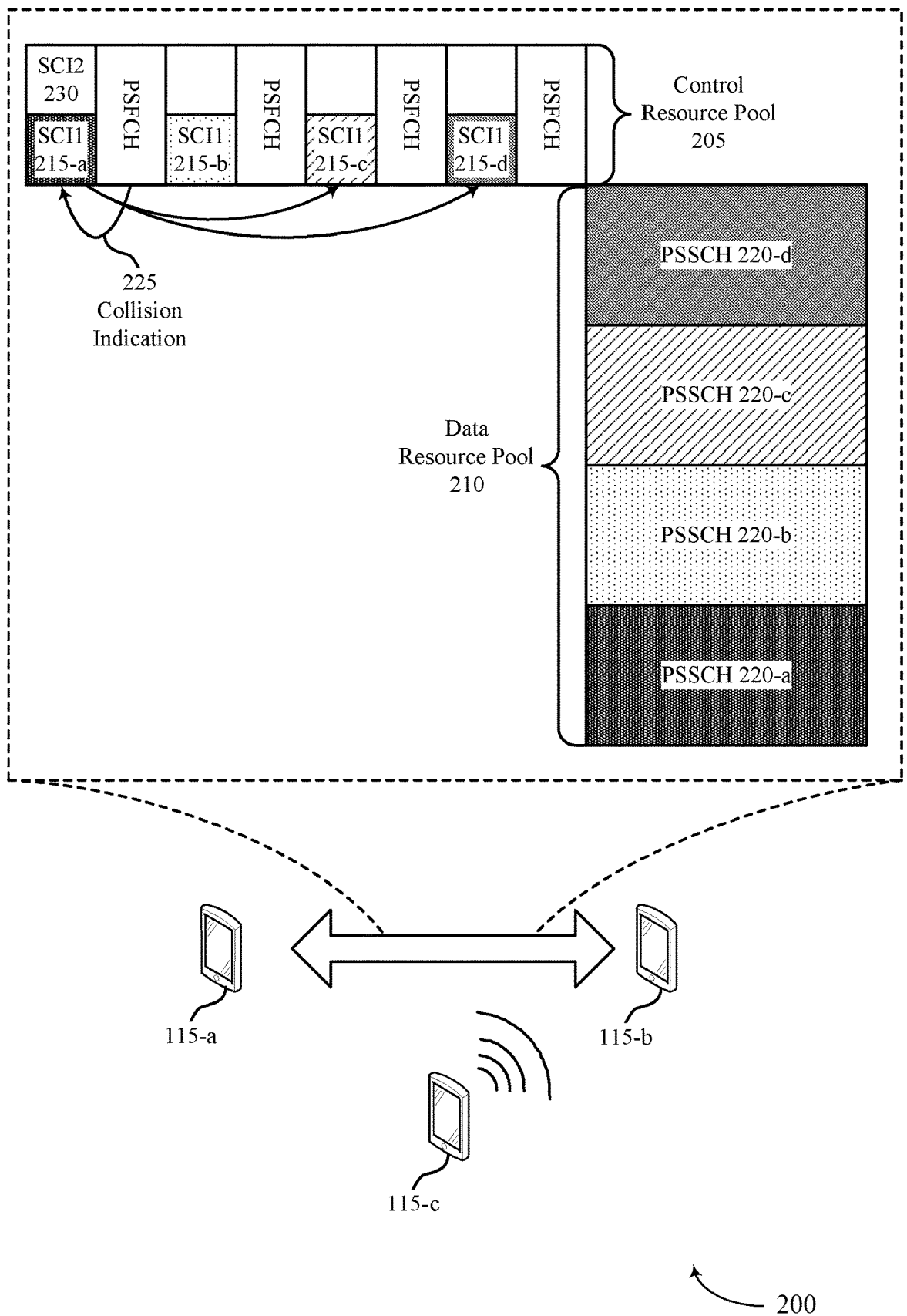
FIG. 2 illustrates an example of a wireless communications system that supports techniques for control resource pool-gated data transmission in accordance with aspects of the present disclosure.

FIG. 2 illustrates an example of a wireless communications system 200 that supports techniques for control resource pool-gated data transmission in accordance with aspects of the present disclosure. The wireless communications system 200 may include a UE 115-a, a UE 115-b, and a UE 115-c, which may each be an example of a UE 115 as described with reference to FIG. 1.

The wireless communications system 200 may support sidelink communications using decoupled control and data resource pools. For example, UEs 115 may communicate control signaling in a control resource pool 205 and data signaling in a data resource pool 210. In some cases, the control resource pool 205 may be in 6 GHz or sub-6 GHz radio frequency spectrum band, and the data resource pool 210 may be in a mmW radio frequency spectrum band.

UEs 115 may communicate SCI on resources in the control resource pool 205. For example, a transmitting UE 115 may transmit a first-stage SCI on sidelink control channel resources 215 in the control resource pool 205, and receiving UEs 115 may monitor the control resource pool 205 for SCI from transmitting UEs 115. The first-stage SCI may schedule sidelink shared channel resources 220 in the data resource pool for a sidelink data transmission.

In some cases, the control resource pool 205 may be configured according to a mini-slot structure. For example, there may be a number of mini-slots per slot in the control resource pool 205. Each mini-slot may include one or more subchannels in the control resource pool 205. In some cases, a first-stage SCI may be transmitted on sidelink control channel resources 215 which spans a mini-slot in the control resource pool 205. In some cases, the mini-slot structure may reduce a scheduling delay when scheduling sidelink shared channel resources 220 in the higher band with a higher band numerology.

The control resource pool 205 may include sidelink control channel resources or sidelink shared channel resources, or both. For example, a UE 115 may transmit a first-stage SCI on sidelink control channel resources 215 and transmit a second-stage SCI on shortened sidelink shared channel resources 230 (e.g., sidelink shared channel resources which span a mini-slot) in the control resource pool 205. In some cases, a first-stage SCI may include a Layer 1 source identifier corresponding to the transmitting UE 115. A Layer 1 destination identifier may be included in a first-stage SCI or a second-stage SCI, or both. In some cases, a second-stage SCI may include a transmission configuration indicator (TCI) state field for PSSCH and one or more CSI triggering state fields for CSI-RS.

In some cases, a first-stage SCI may reserve up to two additional resources in the control resource pool. In some cases, the up to two additional resources may be reserved for a retransmissions of the first-stage SCI. For example, a first-stage SCI transmitted on sidelink control channel resources 215-a may reserve sidelink control channel resources 215-c and sidelink control channel resources 215-d. In some cases, the sidelink control channel resources 215-c and the sidelink control channel resources 215-d may be reserved in case the first-stage SCI transmitted on the sidelink control channel resources 215-a collides with another SCI transmission.

In some cases, the control resource pool 205 may be multiplexed with sidelink feedback channel resources. Sidelink feedback channel resources may be multiplexed with sidelink control channel resources in the control resource pool 205 in the time domain, frequency domain, or both. For example, the sidelink feedback channel resources may be time division multiplexed with the sidelink control channel resources 215. The sidelink feedback channel resources may be used to provide ACK/NACK feedback for data signaling, control signaling, or both. In some cases, the sidelink feedback channel resources may similarly be configured according to the mini-slot structure.

The wireless communications system 200 may support techniques to gate sidelink data transmissions in the data resource pool 210 by detecting a resource collision in the control resource pool 205. There may be a mapping between resources in the control resource pool 205 and the data resource pool 210. For example, the sidelink control channel resource 215-a may map to a subchannel of the sidelink shared channel resources 220-a. Therefore, if a collision is detected in the control resource pool 205, the control resource pool collision may correspond to a resource collision in the data resource pool 210. Receiving UEs 115 may monitor the control resource pool 205 and provide a feedback message on the sidelink feedback channel resources to indicate the collision to one or more transmitting, colliding UEs 115. A transmitting UE 115 may then gate, or cancel, the sidelink data transmission based on receiving the indication of the collision.

In an example, the UE 115-a may transmit a first-stage SCI on the sidelink control channel resources 215-a to reserve the sidelink shared channel resources 220-a for a sidelink data transmission. The first-stage SCI may reserve future resources for first-stage SCI, including the sidelink control channel resources 215-c and the sidelink control channel resources 215-d. In some cases, the first-stage SCI may include indications of a time domain resource allocation (TDRA) and frequency domain resource allocation (FDRA) for the sidelink data transmission. For example, the first-stage SCI may include a TDRA and FDRA corresponding to the sidelink shared channel resources 220-a.

The UE 115-b, which may be the intended recipient or destination of the sidelink data transmission, may monitor the control resource pool 205 and detect a collision on the sidelink control channel resources 215-a. For example, the UE 115-c may also transmit a first-stage SCI on the sidelink control channel resources 215-a. In some cases, the UE 115-b may still decode the first-stage SCI if the interference is not too strong. Based on a modulation and coding scheme (MCS) in the first-stage SCI and the estimated interference, the UE 115-b may send a feedback message indicating an ACK or a NACK.

The UE 115-b may transmit a feedback message with a collision indication 225 to the UE 115-a, indicating that there was interference and a possible collision on the sidelink control channel resources 215-a. The UE 115-b may send the feedback message indicating the ACK or NACK in a sidelink feedback channel resource, such as a mini-slot PSFCH resource. In some cases, a sidelink feedback channel resource for the feedback message may be determined based on the SCI mini-slot including the first-stage SCI, a subchannel index in the control resource pool 205, a subchannel index in the data resource pool 210, and a transmitter identifier (e.g., of the UE 115-a).

Based on receiving the collision indication 225, the UE 115-a may gate the data transmission on the sidelink shared channel resources 220-a. For example, if a NACK is reported, the UE 115-a may not transmit on the corresponding PSSCH, and the UE 115-b may not decode the corresponding PSSCH. The UE 115-a may retransmit the first-stage SCI on the sidelink control channel resources 215-c. The UE 115-b may receive the retransmission of the first-stage SCI on the sidelink control channel resources 215-c and determine whether there is interference or a possible collision on sidelink control channel resources 215-c. In some cases, the retransmission of the first-stage SCI may include updated TDRA and FDRA fields, such as TDRA and FDRA fields corresponding to sidelink shared channel resources 220-c.

In some cases, the UE 115-b may determine there is not a collision or interference on the sidelink control channel resources 215-c, and the UE 115-b may transmit an acknowledgment to the UE 115-a on sidelink feedback channel resources. The acknowledgment may indicate that there is no expected collision on sidelink shared channel resources 220-c. The UE 115-a may then transmit the sidelink data transmission on the sidelink shared channel resources 220-c based on receiving the acknowledgment for the first-stage SCI on sidelink control channel resources 215-c. The mapping of the mini-slot first-stage SCI to PSSCH may indicate that if there is no collision for the first-stage S CI, there may not be a PSSCH resource collision. If the UE 115-b detects a collision or strong interference on the sidelink control channel resources 215-c, the UE 115-b may report a NACK on an associated PSFCH resource, and the UE 115-a may retransmit the first-stage SCI on another reserved resource.

In some cases, a receiving UE 115, such as the UE 115-b, may determine a collision based on a shortened PSSCH decoding failure in the control resource pool 205. In some cases, the second-stage SCI link level performance may be similar to a first-stage SCI link level performance. The resource overhead of shortened sidelink shared channel resources 230 may be smaller than the resource overhead of sidelink shared channel resources 220. In some examples, the UE 115-*b* may detect a collision based on a second-stage SCI decoding failure or both a second-stage SCI decoding failure and a shortened PSSCH data decoding failure. If the shortened PSSCH only includes second-stage SCI, the receiving UE 115 may be able to decode the shortened PSSCH in the control resource pool 205 but not PSSCH in the data resource pool 210 if there is a collision.

In some examples, a receiving UE 115 may determine the collision based on demodulation reference signals (DMRS) transmitted in the control resource pool 205. For example, the UE 115-*b* may estimate interference on the sidelink control channel resources 215-*a* based on DMRS transmitted with a second-stage SCI on corresponding shortened sidelink shared channel resources 230. A transmitter or source identifier may be included in the mini-slot first-stage SCI, and the DMRS scrambling identifier of the shortened sidelink shared channel resources 230 may be a function of the transmitter identifier. A receiving UE 115, such as the UE 115-*b*, may estimate the interference level based on the DMRS transmitted on the shortened sidelink shared channel resources 230.

In some cases, the UE 115-*b* may transmit the collision indication 225 to indicate the collision if the measured interference exceeds a threshold. For example, the UE 115-*b* may determine a nominal interference level with no collision based on prior shortened sidelink shared channel transmissions from the UE 115-*a*. If an estimated interference level exceeds the nominal value by a threshold, it may correspond to an SCI collision or strong interference. In some examples, the threshold may be determined based on an MCS of the PSSCH resources, which may be indicated by the first-stage SCI. In some cases, if an anchor control resource pool is configured in a licensed band, it may be less likely that other (e.g., non-SCI collision) interference has occurred and more likely that the detected interference corresponds to a first-stage SCI collision. If the resulting interference is from other interferences, the transmitting UE 115 (e.g., the UE 115-*a*) may still just retransmit the first-stage SCI at a later reserved resource.

As described, the wireless communications system 200 may implement techniques for mapping from control mini-slot resources to subchannels. For example, the sidelink control channel resources 215-*a* may map to the sidelink shared channel resources 220-*a*, the sidelink control channel resources 215-*b* may map to the sidelink shared channel resources 220-*b*, the sidelink control channel resources 215-*c* may map to the sidelink shared channel resources 220-*c*, and the sidelink control channel resources 215-*d* may map to the sidelink shared channel resources 220-*d*. Some additional techniques for mapping from the control resource pool 205 to the data resource pool 210 are described in more detail with reference to FIG. 4.

In some cases, legacy first-stage SCI may be transmitted in the data resource pool 210 for second stage channel sensing. Transmitting the legacy first-stage SCI in the data resource pool 210 may enable coexistence with legacy nodes sharing an at least partially overlapping resource in the data resource pool 210. For cross-band scheduling, the legacy first-stage CSI in the data band may be used for legacy channel sensing.

In some cases, the wireless communications system 200 may support a two-stage channel sensing technique. A first stage may be performed to handle channel sensing among nodes or UEs 115 which utilize the decoupled control and resource pools. A second stage may be performed to handle channel sensing among nodes or UEs 115 which do not supported the decoupled control and resource pools, such as legacy UEs 115.

For a wireless communications system with only nodes that are configured to use the decoupled resource pools described herein, UEs 115 may use the control resource pool 205 for channel sensing. In this example, UEs 115 may refrain from sending legacy first-stage SCI on the data resource pool 210, as there may not be any legacy nodes, and channel sensing may be handled using just the control resource pool 205.

If the control resource pool 205 and the data resource pool 210 are in a same radio frequency spectrum band, nodes or UEs 115 may perform channel sensing in the control resource pool 205. For example, the channel sensing in the control resource pool 205 may sufficiently capture or represent sidelink interference, and performing channel sensing in the data resource pool 210 may not provide much greater resolution or information. As such, the UEs 115 may, in some cases, refrain from performing channel sensing in the data resource pool 210 if the control resource pool 205 and the data resource pool 210 are in a same radio frequency spectrum band.

For cross-band scheduling, nodes or UE 115 may observe band-dependent reference signal received power (RSRP) measurements. To a receiving UE 115, the RSRP from a transmitting UE 115 may vary from band to band. For example, the transmitting UE 115 may use different antenna patterns, different radio frequency chains, and other differing transmit configurations for different radio frequency spectrum bands. Therefore, for some cross-band scheduling configurations, the wireless communications system 200 may still support legacy first-stage SCI in the data resource pool for channel sensing. For example, channel sensing for resource selection may still be based on legacy first-stage SCI in the data resource pool 210. The control resource pool 205 may be used for early collision detection to gate the data transmission in the data resource pool 210.

In some cases, the wireless communications system 200 may support techniques to map a first RSRP measured in a first radio frequency spectrum band of the control resource pool 205 to a second RSRP measured in a second radio frequency spectrum band of the data resource pool 210. A sensing node, such as a receiving or sensing UE 115, may identify some information from an RSRP history in the high radio frequency spectrum band. For example, the receiving UE 115 may determine a pathloss from transmitting UEs 115 in the network. In some cases, the receiving UE 115 may determine a transmit beam-specific pathloss of transmitting UEs 115. The transmitting UE 115 may also use different transmit beams for different receiving UEs 115, and receiving UEs 115 may identify different configurations or transmit beam pathloss values for the different transmit beams. A mini-slot first-stage SCI may include a source and destination identifier, and the receiving UE 115 may know which transmitting UE 115 and which transmit beam the RSRP maps to in the high band.

Figure 3:
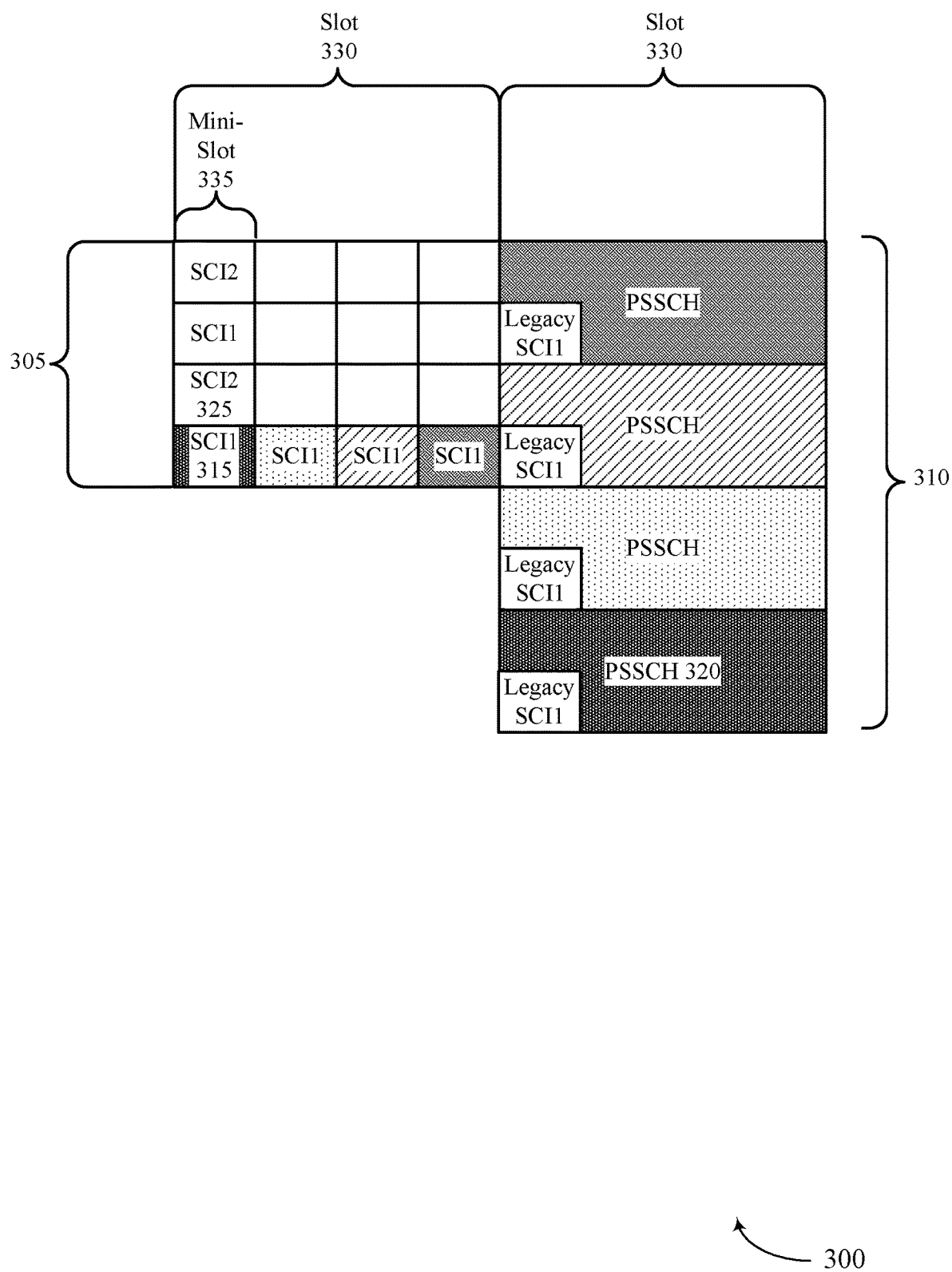
FIGS. 3 through 5 illustrate examples of sidelink resource configurations that support techniques for control resource pool-gated data transmission in accordance with aspects of the present disclosure.

FIG. 3 illustrates an example of a sidelink resource configuration 300 that supports techniques for control resource pool-gated data transmission in accordance with aspects of the present disclosure.

A wireless communications system may use decoupled control and data resource pools for sidelink communications. For example, the sidelink resource configuration 300 may include a control resource pool 305 and a data resource pool 310. The control resource pool 305 may be configured according to a mini-slot structure as described herein, including sidelink control channel resources 315 and shortened sidelink shared channel resources 320. In some cases, mini-slot PSFCH resources may be multiplexed (e.g., time division multiplexed or frequency division multiplexed, or both) with mini-slot resources configured for first-stage and second-stage SCI. A slot 330 may include multiple mini-slots 335.

There may be a mapping between resources in the control resource pool 305 and resources in the data resource pool 310, as described in more detail with reference to FIG. 4. For example, a first-stage SCI transmitted on sidelink control channel resources 315 in the control resource pool 305 may reserve sidelink shared channel resources 320 in a corresponding, or mapped, subchannel in the data resource pool 310. In some cases, different sidelink control channel resources 315 in different mini-slots may correspond to sidelink shared channel resources 320 in different subchannels of a slot 330 in the data resource pool 310.

The control resource pool 305 may be multiplexed with the data resource pool 310. For example, as shown, the control resource pool 305 may be time division multiplexed with the data resource pool 310. Additionally, or alternatively, the control resource pool 305 may be frequency division multiplexed with the data resource pool 310. In some cases, the payload for a first-stage SCI in the control resource pool 305 may reduce a burden of channel sensing for other nodes (e.g., other UEs 115) in the wireless communications system.

In some examples, legacy first-stage SCI may be carried in the data resource pool 310. For example, legacy first-stage SCI may be transmitted in the data resource pool 310 for second stage channel sensing. The legacy first-stage SCI may be used for legacy channel sensing in the data resource pool 310.

Figure 4:
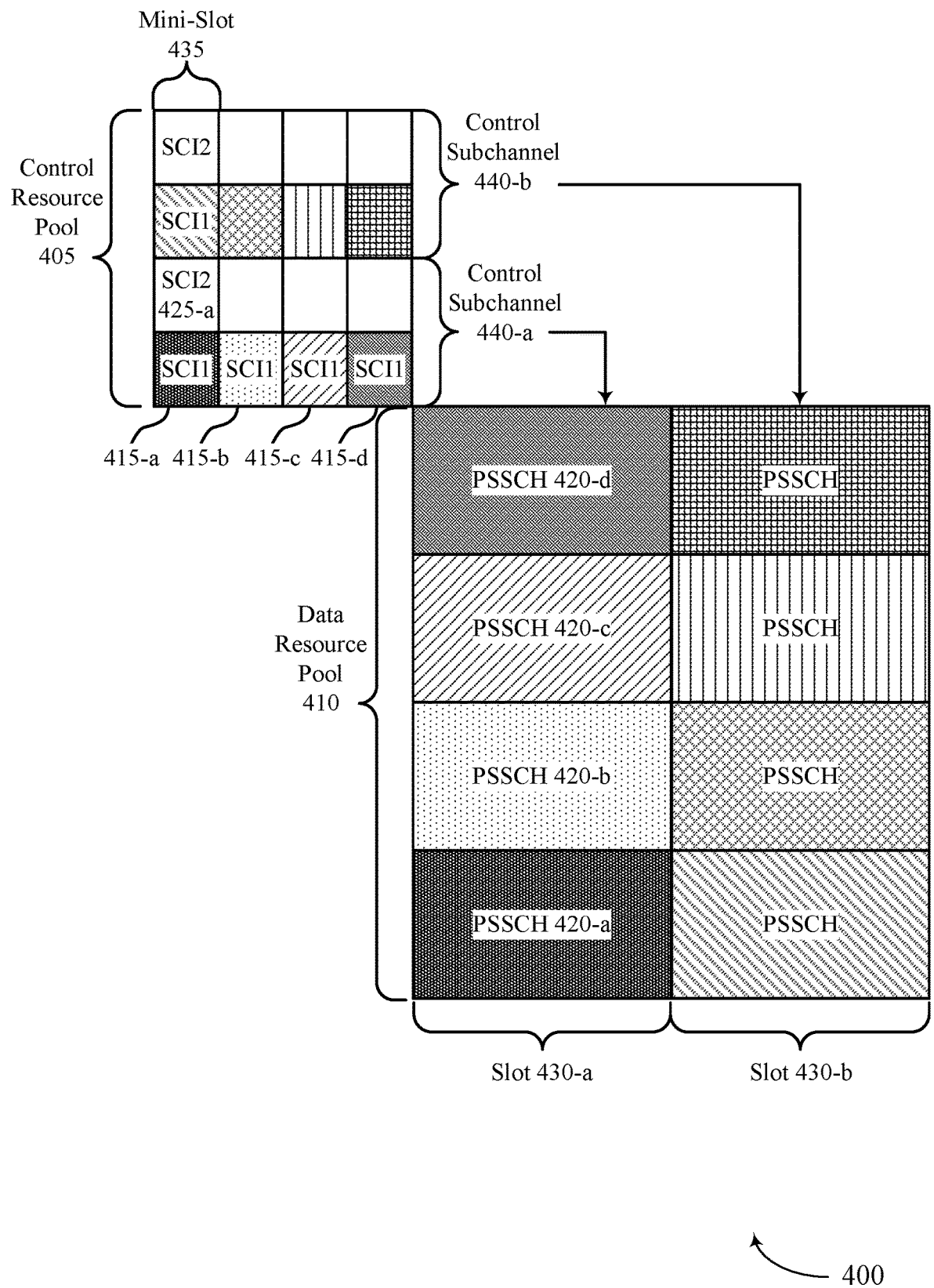

FIG. 4 illustrates an example of a sidelink resource configuration 400 that supports techniques for control resource pool-gated data transmission in accordance with aspects of the present disclosure.

A wireless communications system may use decoupled control and data resource pools for sidelink communications. For example, the sidelink resource configuration 400 may include a control resource pool 405 and a data resource pool 410. The control resource pool 405 may be configured according to a mini-slot structure as described herein, including sidelink control channel resources 415 and shortened sidelink shared channel resources 425. In some cases, mini-slot PSFCH resources may be multiplexed (e.g., time division multiplexed or frequency division multiplexed, or both) with mini-slot resources in the control resource pool 405 configured for first-stage and second-stage SCI. A slot 430 may include multiple mini-slots 435.

Resources in the control resource pool 405 may be mapped to resources in the data resource pool 410. In some cases, there may be an implicit one-to-one mapping between control mini-slot resources in the control resource pool 405 to subchannels in the data resource pool 410. If a UE 115 transmits a first-stage SCI in sidelink control channel resources 415, the first-stage SCI may reserve sidelink shared channel resources 420 which correspond to, or are mapped to, the sidelink control channel resources 415. For example, sidelink control channel resources 415-*a* may map to sidelink shared channel resources 420-*a*, sidelink control channel resources 415-*b* may map to sidelink shared channel resources 420-*b*, sidelink control channel resources 415-*c* may map to sidelink shared channel resources 420-*c*, and sidelink control channel resources 415-*d* may map to sidelink shared channel resources 420-*d*. In some other examples, different mapping configurations may be implemented.

In some cases, there may be a one-to-one mapping between a mini-slot 435 in the control resource pool 405 and a slot 430 in the data resource pool 410. In some other examples, a mini-slot 435 in the control resource pool 405 may map to multiple slots 430 in the data resource pool. For example, to support cross-carrier scheduling from a low radio frequency spectrum band to a high radio frequency spectrum band, the mini-slot 435 may map to multiple slots 430 due to different subcarrier spacing (SCS) numerologies in the low radio frequency spectrum band and the high radio frequency spectrum band. For example, a 30 KHz SCS numerology in the low radio frequency spectrum band and a 60 KHz numerology in the high radio frequency spectrum band may use a mapping of one mini-slot 435 in the control resource pool 405 to two slots 430 in the data resource pool 410. For example, for a first mini-slot 435, resources in the control subchannel 440-*a* may map to different subchannels in the slot 430-*a*, and resources in the control subchannel 440-*b* may map to those subchannels in the slot 430-*b*. Similarly, a 30 KHz SCS numerology in the low radio frequency spectrum band and a 120 KHz numerology in the high radio frequency spectrum band may use a mapping of one mini-slot 435 in the control resource pool 405 to four slots 430 in the data resource pool 410.

In some cases, different techniques may be implemented to map the resources from a first number of mini-slots 435 in the control resource pool 405 to a second number of slots 430 in the data resource pool 410. In a first example, slots 430 of the data resource pool 410 may first map to control subchannels 440 in the control resource pool 405, then the subchannels of each slot 430 in the data resource pool 410 may be mapped to different mini-slots 435 in the control resource pool 405. For example, the slot 430-*a* may map to the control subchannel 440-*a*, and the slot 430-*b* may map to the control subchannel 440-*b*. Then, then, mini-slots 435 in a control subchannel 440 may be mapped to the different subchannels in the mapped slot 430. In this example, the sidelink control channel resources 415-*a* through 415-*d* may map, respectively, to the sidelink shared channel resources 420-*a* through 420-*d*.

In a second example of the mapping, subchannels in a slot 430 of the data resource pool 410 may first be mapped to control subchannels 440 within a mini-slot 435 then across mini-slots 435. For example, control subchannel 440-*a* and control subchannel 440-*b* in a first mini-slot 435 (e.g., corresponding to sidelink control channel resources 415-*a*) may be mapped to data resource pool subchannels in slot 430-*a*, then control subchannel 440-*a* and control subchannel 440-*b* in a second mini-slot 435 (e.g., corresponding to sidelink control channel resources 415-*b*) may be mapped to the other data resource pool subchannels in slot 430-*a*. In this example, sidelink control channel resources 415-*a* may be mapped to sidelink shared channel resources 420-*a*, and sidelink control channel resources 415-*b* may be mapped to sidelink shared channel resources 420-*c*. Sidelink control channel resources 415-*b* and 415-*d* may, in this example, be mapped to slot 430-*b*.

In some cases, retransmission of low latency transport blocks from different transmitters may be less likely to collide with these mapping configurations. For example, the scheduling first-stage SCIs from different transmitters may be more likely to be time division multiplexed, and the transmitters may be able to listen to resource reservations from other transmitters, even with a half-duplex constraint.

The first example and the second example of possible mappings may have fixed one-to-one mappings from the control resource pool 405 to the data resource pool 410. As interference in the control resource pool 405 and the data resource pool 410 may be different, UEs 115 may be configured to average out the interference between the two different resource pools. By averaging the interferences, an interference-impacted control subchannel may be prevented from creating a performance or spectrum utilization bottleneck.

In some cases, the mapping may be based on a permutation. For example, based on a slot index, a permutation (e.g., a random permutation or pseudo-random permutation based on the slot index) may be applied to the one-to-one mapping as described in the first example or the second example. For example, the mapping may be shifted or modified based on a parameter, such as a slot index or other value.

Figure 5:
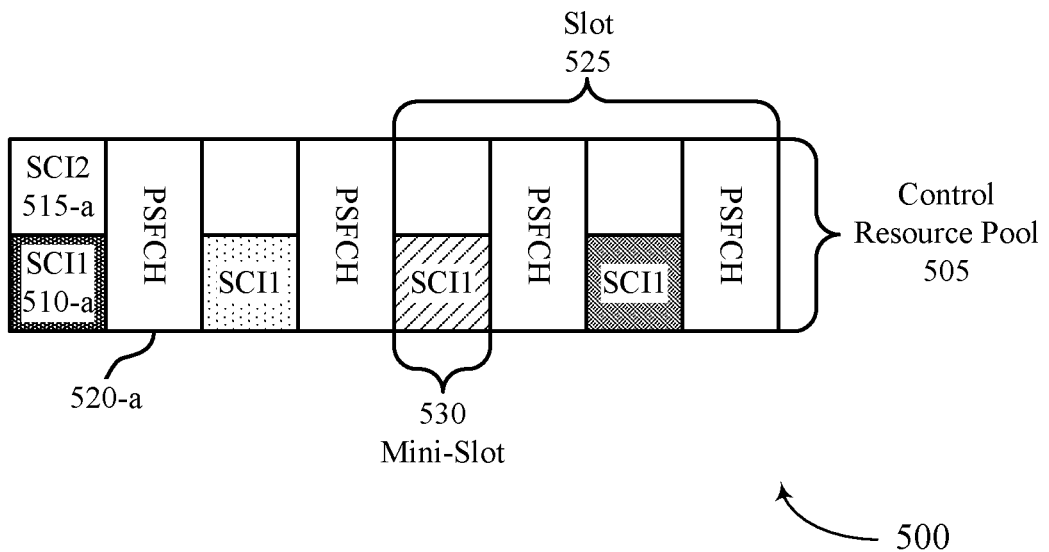
Figure 5:
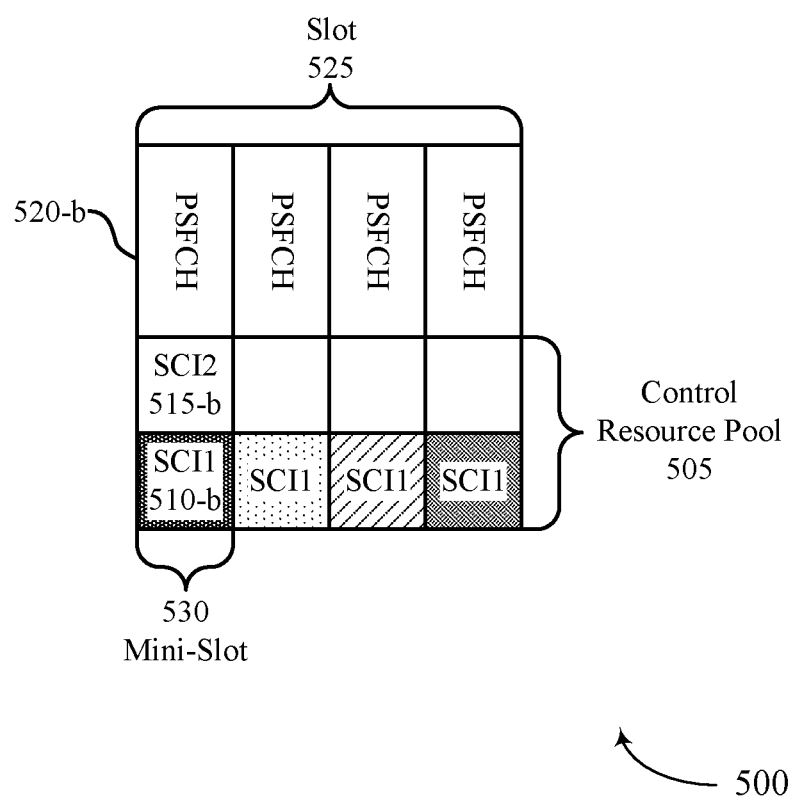

FIG. 5 illustrate examples of sidelink resource configurations 500 and 501 that support techniques for control resource pool-gated data transmission in accordance with aspects of the present disclosure.

A wireless communications system may use decoupled control and data resource pools for sidelink communications. A UE 115 may transmit first-stage SCI and, in some cases, second-stage SCI in the control resource pool 505 using sidelink control channel resources and sidelink shared channel resources, respectively. In some cases, a control resource pool 505 may be configured according to a mini-slot configuration. For example, a slot 525 may include multiple mini-slots 530. The control resource pool 505 may include one or more control subchannels, where each mini-slot 530 may correspond to one or more control subchannels. the sidelink control channel resources in the control resource pool 505 may be referred to as mini-slot PSCCH resources 510, and the sidelink shared channel resources in the control resource pool 505 may be referred to as mini-slot PSSCH resources 515.

In some case, the control resource pool 505 may include, or may be multiplexed with, PSFCH resources. In some cases, the PSFCH resources may also be configured according to the mini-slot configuration. For example, the sidelink resource configuration 500 may include mini-slot PSFCH resources 520 that are time division multiplexed with the mini-slot SCI resource pool in the control resource pool 505 (e.g., the mini-slot SCI resource pool including the mini-slot PSCCH resources 510 and mini-slot PSSCH resources 515). In some cases, time division multiplexing the mini-slot PSFCH resources 520 with the mini-slot SCI resources may provide for a configurable mini-slot. For the sidelink resource configuration 501, the mini-slot PSFCH resources 520 may be frequency division multiplexed with the SCI resource pool in the control resource pool. In some cases, frequency division multiplexing the mini-slot PSFCH resources 520 with the SCI resource pool may enable faster feedback time.

A receiving UE 115 may report ACK/NACK feedback on an associated mini-slot PSFCH resource 520 based on whether a collision is detected on a mini-slot PSCCH resource 510. If the receiving UE 115 detects a possible SCI collision, the receiving UE 115 may report a NACK on the mini-slot PSFCH resource 520. If the receiving UE 115 does not detect a collision, the receiving UE 115 may report an ACK on the mini-slot PSFCH resource 520. In some cases, the receiving UE 115 may determine which mini-slot PSFCH resource 520 to use to send the feedback based on the SCI mini-slot 530 of the mini-slot PSCCH resource 510, a subchannel index corresponding to the mini-slot PSCCH resource 510, a transmitter identifier of the transmitting UE 115, or any combination thereof.

For example, if a receiving UE 115 detects a collision for a first-stage SCI transmitted on a mini-slot PSCCH resource 510-a, the receiving UE 115 may report a NACK on a mini-slot PSFCH resource 520-a. Similarly, if a receiving UE 115 detects a collision for a first-stage SCI transmitted on a mini-slot PSCCH resource 510-b, the receiving UE 115 may report a NACK on a mini-slot PSFCH resource 520-b. In some cases, the receiving UE 115 may detect the collision based on a decoding error of a second-stage SCI transmitted on a mini-slot PSSCH resource 515 or based on an interference measurement taken using a DMRS transmitted with the second-stage SCI on the mini-slot PSSCH resource 515.

Figure 6:
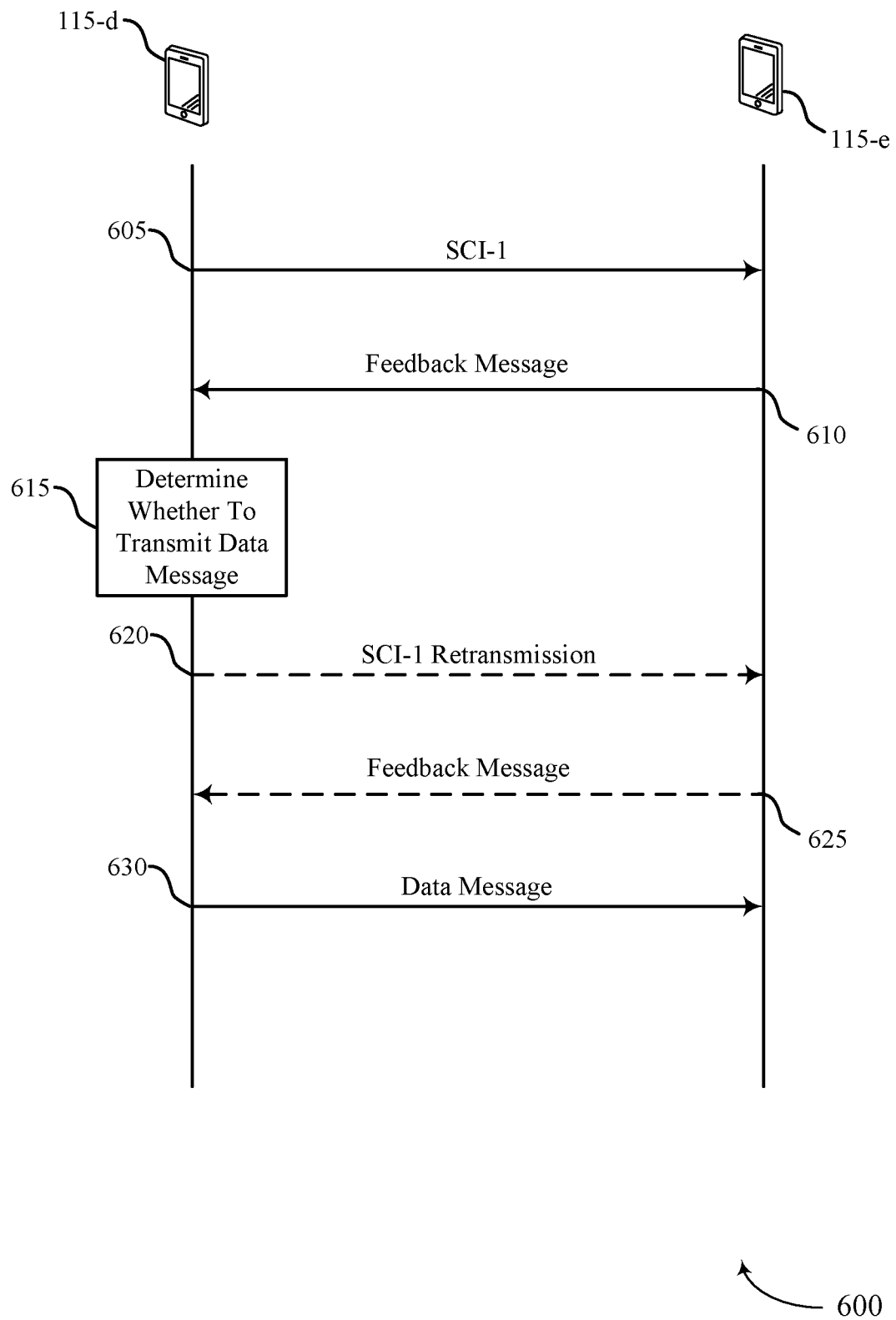
FIG. 6 illustrates an example of a process flow that supports techniques for control resource pool-gated data transmission in accordance with aspects of the present disclosure.

FIG. 6 illustrates an example of a process flow 600 that supports techniques for control resource pool-gated data transmission in accordance with aspects of the present disclosure. The process flow 600 may be implemented by a UE 115-d or a UE 115-e, or both, which may be respective examples of a UE 115 as described with reference to FIG. 1. In some cases, some signaling or procedures in the process flow 600 may occur in different orders than shown. Additionally, or alternatively, some signaling or procedures shown may not occur, or some additional signaling or procedures may occur, or both.

At 605, the UE 115-d may transmit a first SCI message during a first TTI of a first resource pool, the first SCI message indicating a data message to be transmitted on a subchannel of a second resource pool to the UE 115-e. In some cases, the first SCI message may be an example of a first-stage SCI, or SCI-1. The first resource pool may be an example of a control resource pool, and the second resource pool may be an example of a data resource pool. In some cases, the first TTI may be an example of a mini-slot, and the first resource pool may be configured according to a mini-slot configuration as described herein. The first SCI message may include TDRA and FDRA fields, indicating a resource allocation in the data resource pool for the data message.

In some examples, the first SCI message may reserve up to two additional mini-slot PSCCH resources in the first resource pool. For example, the UE 115-d may reserve, based on transmitting the first SCI message, a third TTI of the first resource pool and, in some cases, a fourth TTI of the first resource pool. The additional mini-slot PSCCH resources may be reserved for retransmissions of the SCI message.

In some cases, resources in the first resource pool may correspond to, or be mapped to, resources in the second resource pool. For example, there may be a one-to-one mapping between SCI-1 resources in the control resource pool to PSSCH resources in the data resource pool. Therefore, if a collision is detected between SCI-1 in the control resource pool, it may indicate a possible resource collision in the data resource pool.

The UE 115-e may monitor the first resource pool for the first SCI message. UE 115-e may check for interference or a collision of the first SCI message. For example, UE 115-e may determine if there is a collision based on a DMRS in a second SCI message. The second SCI message may be frequency division multiplexed in a same slot as the first SCI message. The UE 115-e may estimate interference based on the DMRS in the second SCI message. If the estimated interference exceeds a nominal value by a threshold, the UE 115-e may determine that interference has been detected for the first SCI message. In some examples, the DMRS may be scrambled using a transmitter identifier of the UE 115-d. In some cases, the UE 115-e may attempt to detect interference or a collision based on whether the second SCI message can be decoded.

At 610, the UE 115-d may receive a feedback message from the UE 115-e for the first SCI message during a second TTI of the first resource pool. In some cases, the second TTI may correspond to a second mini-slot which may include mini-slot PSFCH resources. For example, mini-slot PSFCH resources may be time division multiplexed or frequency division multiplexed with the control resource pool.

At 615, the UE 115-d may determine whether to transmit the data message on the subchannel of the second resource pool based on the feedback message received from the UE 115-e. For example, if the feedback message indicates an ACK for the first SCI message, the UE 115-d may transmit the data message. At 630, the UE 115-d may transmit the data message on the subchannel of the second resource pool based on the feedback message indicating an ACK for the first SCI message.

In some cases, the feedback message may include a NACK, indicating that strong interference or a collision was detected for the first SCI message. At 620, the UE 115-d may transmit a retransmission of the first SCI message during the third TTI of the first resource pool based on the feedback message indicating a NACK. The retransmission of the first SCI may indicate the data message is to be transmitted on a second subchannel of the second resource pool to the UE 115-e. The UE 115-d may again determine whether there is a collision or strong interference for the retransmission of the first SCI. At 625, the UE 115-d may receive a second feedback message from the UE 115-d during a fourth TTI of the first resource pool, the second feedback message indicating an ACK for the retransmission of the first SCI message. At 630, the UE 115-d may transmit the data message on the second subchannel of the second resource pool based on the second feedback message.

Figure 7:
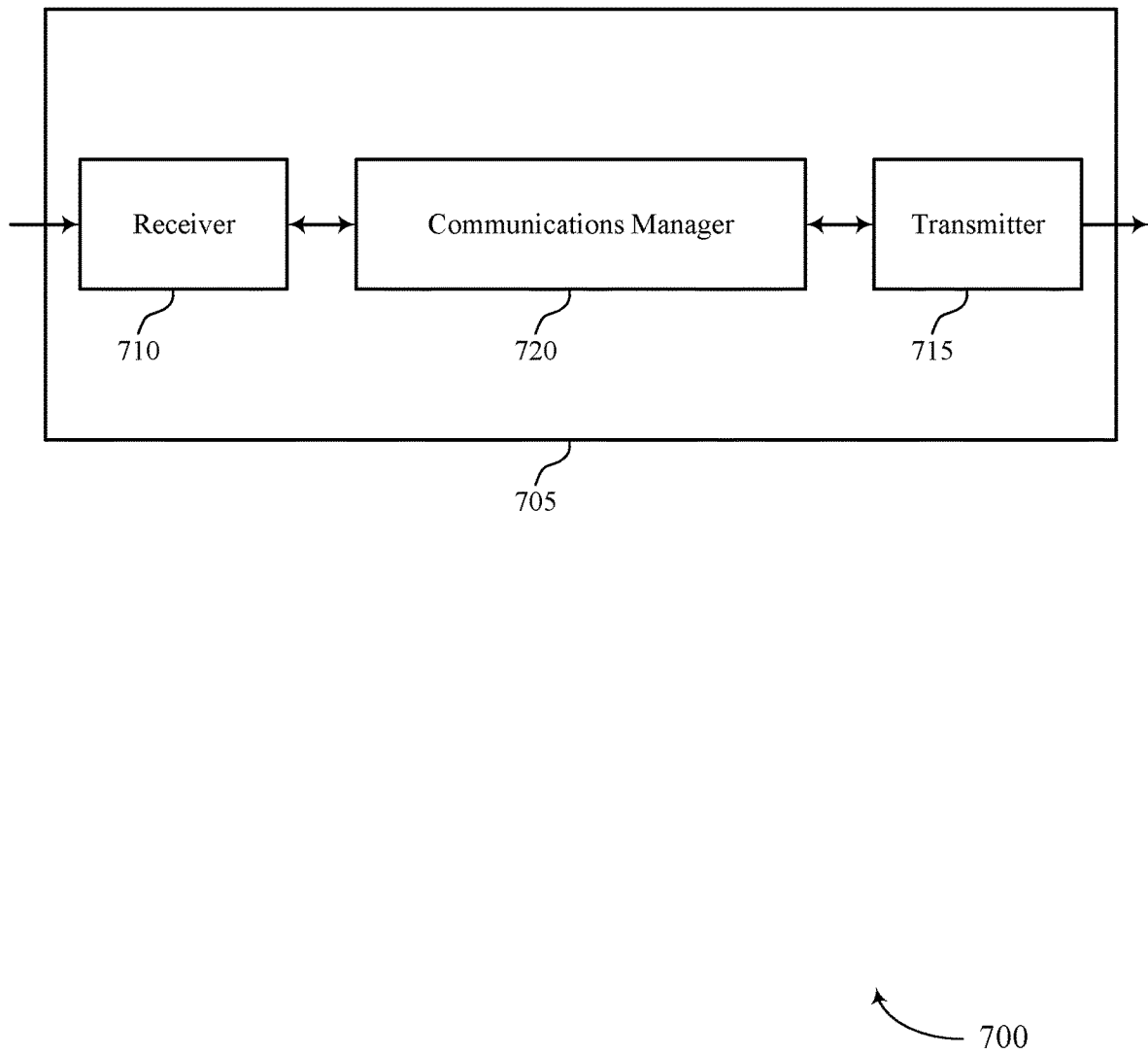
FIGS. 7 and 8 show block diagrams of devices that support techniques for control resource pool-gated data transmission in accordance with aspects of the present disclosure.

FIG. 7 shows a block diagram 700 of a device 705 that supports techniques for control resource pool-gated data transmission in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for control resource pool-gated data transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for control resource pool-gated data transmission). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for control resource pool-gated data transmission as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for transmitting a first sidelink control information message during a first transmission time interval of a first resource pool, the first sidelink control information message indicating a data message to be transmitted on a subchannel of a second resource pool to a second UE. The communications manager 720 may be configured as or otherwise support a means for receiving a feedback message from the second UE for the first sidelink control information message during a second transmission time interval of the first resource pool. The communications manager 720 may be configured as or otherwise support a means for determining whether to transmit the data message on the subchannel of the second resource pool based on the feedback message received from the second UE.

Additionally or alternatively, the communications manager 720 may support wireless communications at a second UE in accordance with examples as disclosed herein. For example, the communications manager 720 may be configured as or otherwise support a means for receiving, from a first UE, a first sidelink control information message during a first transmission time interval of a first resource pool, the first sidelink control information message indicating a data message to be transmitted by the first UE on a subchannel of a second resource pool. The communications manager 720 may be configured as or otherwise support a means for transmitting a feedback message to the first UE for the first sidelink control information message during a second transmission time interval of the first resource pool. The communications manager 720 may be configured as or otherwise support a means for determining whether to monitor for the data message on the subchannel of the second resource pool based on the feedback message.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption and reduced overhead for sidelink communications. For example, by gating a data transmission which may result in collision, a UE 115 may save power by refraining from transmitting the data transmission. Delay may be reduced by sooner rescheduling the data transmission.

Figure 8:
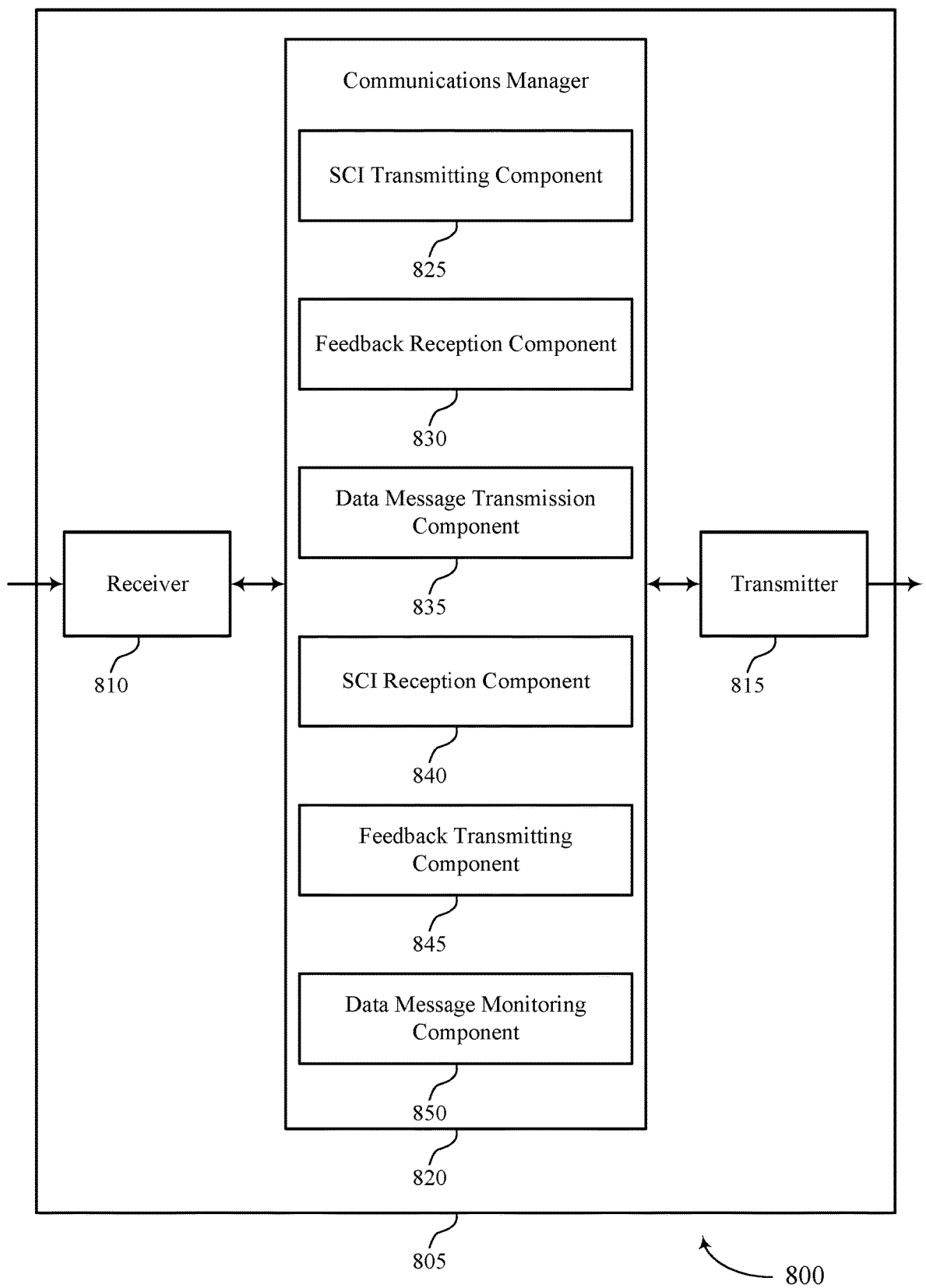

FIG. 8 shows a block diagram 800 of a device 805 that supports techniques for control resource pool-gated data transmission in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for control resource pool-gated data transmission). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for control resource pool-gated data transmission). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for control resource pool-gated data transmission as described herein. For example, the communications manager 820 may include an SCI transmitting component 825, a feedback reception component 830, a data message transmission component 835, an SCI reception component 840, a feedback transmitting component 845, a data message monitoring component 850, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The SCI transmitting component 825 may be configured as or otherwise support a means for transmitting a first sidelink control information message during a first transmission time interval of a first resource pool, the first sidelink control information message indicating a data message to be transmitted on a subchannel of a second resource pool to a second UE. The feedback reception component 830 may be configured as or otherwise support a means for receiving a feedback message from the second UE for the first sidelink control information message during a second transmission time interval of the first resource pool. The data message transmission component 835 may be configured as or otherwise support a means for determining whether to transmit the data message on the subchannel of the second resource pool based on the feedback message received from the second UE.

Additionally or alternatively, the communications manager 820 may support wireless communications at a second UE in accordance with examples as disclosed herein. The SCI reception component 840 may be configured as or otherwise support a means for receiving, from a first UE, a first sidelink control information message during a first transmission time interval of a first resource pool, the first sidelink control information message indicating a data message to be transmitted by the first UE on a sub channel of a second resource pool. The feedback transmitting component 845 may be configured as or otherwise support a means for transmitting a feedback message to the first UE for the first sidelink control information message during a second transmission time interval of the first resource pool. The data message monitoring component 850 may be configured as or otherwise support a means for determining whether to monitor for the data message on the subchannel of the second resource pool based on the feedback message.

Figure 9:
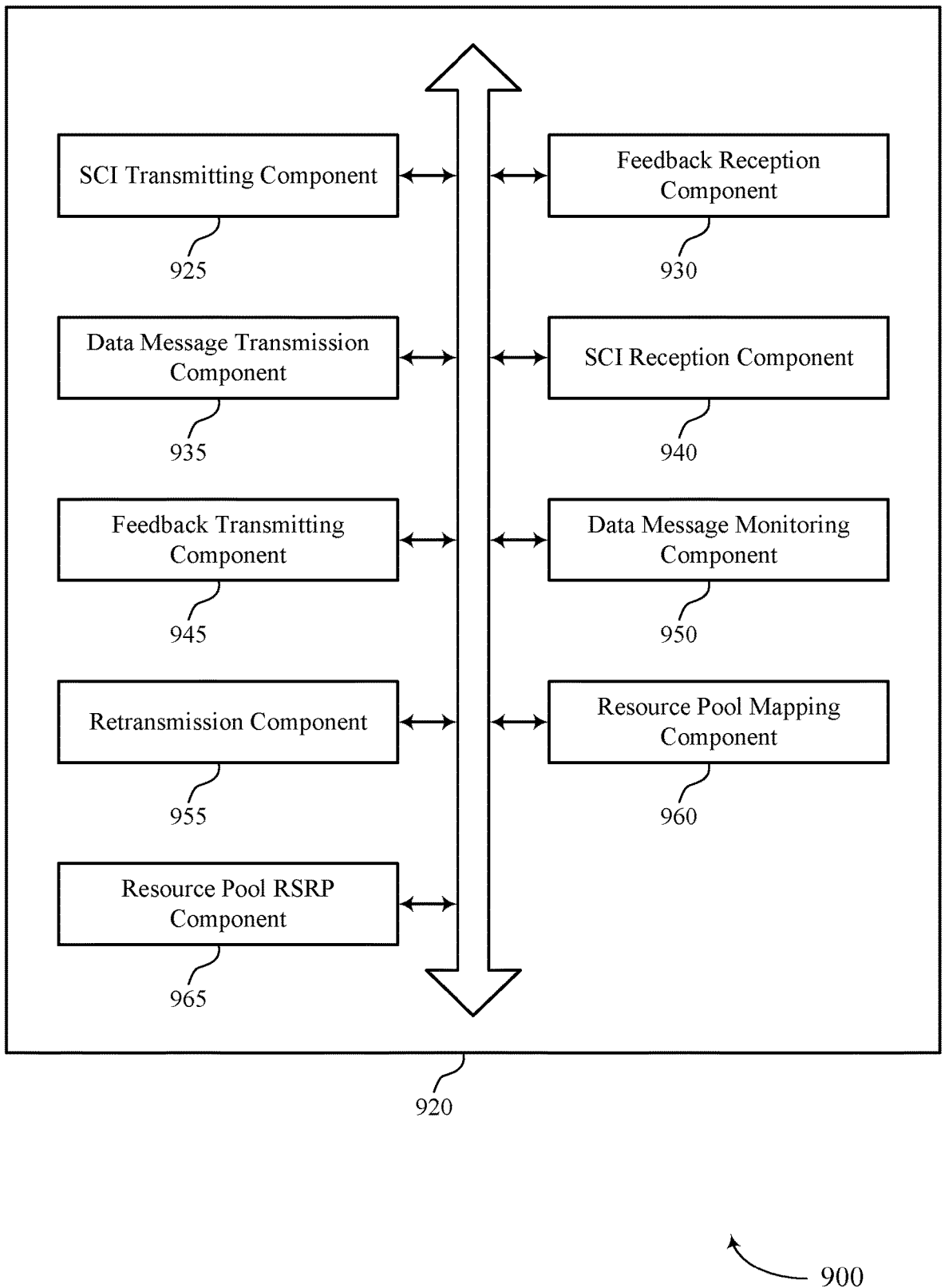
FIG. 9 shows a block diagram of a communications manager that supports techniques for control resource pool-gated data transmission in accordance with aspects of the present disclosure.

FIG. 9 shows a block diagram 900 of a communications manager 920 that supports techniques for control resource pool-gated data transmission in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for control resource pool-gated data transmission as described herein. For example, the communications manager 920 may include an SCI transmitting component 925, a feedback reception component 930, a data message transmission component 935, an SCI reception component 940, a feedback transmitting component 945, a data message monitoring component 950, a retransmission component 955, a resource pool mapping component 960, a resource pool RSRP component 965, or any combination thereof. Each of these components may communicate, directly or indirectly, with one another (e.g., via one or more buses).

The communications manager 920 may support wireless communications at a first UE in accordance with examples as disclosed herein. The SCI transmitting component 925 may be configured as or otherwise support a means for transmitting a first sidelink control information message during a first transmission time interval of a first resource pool, the first sidelink control information message indicating a data message to be transmitted on a subchannel of a second resource pool to a second UE. The feedback reception component 930 may be configured as or otherwise support a means for receiving a feedback message from the second UE for the first sidelink control information message during a second transmission time interval of the first resource pool. The data message transmission component 935 may be configured as or otherwise support a means for determining whether to transmit the data message on the subchannel of the second resource pool based on the feedback message received from the second UE.

In some examples, to support determining whether to transmit the data message, the data message transmission component 935 may be configured as or otherwise support a means for transmitting the data message on the subchannel of the second resource pool based on the feedback message indicating an acknowledgment for the first sidelink control information message.

In some examples, to support determining whether to transmit the data message, the SCI transmitting component 925 may be configured as or otherwise support a means for reserving, based on transmitting the first sidelink control information message, a third transmission time interval of the first resource pool. In some examples, to support determining whether to transmit the data message, the retransmission component 955 may be configured as or otherwise support a means for transmitting a retransmission of the first sidelink control information message during the third transmission time interval of the first resource pool based on the feedback message indicating a negative acknowledgment, the retransmission of the first sidelink control information message indicating the data message to be transmitted on a second subchannel of the second resource pool to the second UE. In some examples, to support determining whether to transmit the data message, the feedback reception component 930 may be configured as or otherwise support a means for receiving a second feedback message from the second UE during a fourth transmission time interval of the first resource pool, the second feedback message indicating an acknowledgment for the retransmission of the first sidelink control information message. In some examples, to support determining whether to transmit the data message, the data message transmission component 935 may be configured as or otherwise support a means for transmitting the data message on the second subchannel of the second resource pool based on the second feedback message.

In some examples, the SCI transmitting component 925 may be configured as or otherwise support a means for transmitting a second sidelink control information message during the first transmission time interval of the first resource pool, where the first sidelink control information message is of a first type and the second sidelink control information message is of a second type.

In some examples, the first sidelink control information message includes a source identifier or a destination identifier, or both.

In some examples, the second sidelink control information message includes a destination identifier, a transmission configuration indicator state for the data message, a channel state information triggering state field, or any combination thereof.

In some examples, the SCI transmitting component 925 may be configured as or otherwise support a means for scrambling a demodulation reference signal included in the second sidelink control information message using a source identifier.

In some examples, the first resource pool and the second resource pool are time division multiplexed or frequency division multiplexed, or both.

In some examples, the resource pool mapping component 960 may be configured as or otherwise support a means for receiving an indication of a mapping between the first resource pool and the second resource pool based on a first subcarrier spacing for the first resource pool and a second subcarrier spacing for the second resource pool.

In some examples, a first slot of the subchannel of the second resource pool maps to a first subchannel of the first transmission time interval of the first resource pool, and a second slot of the subchannel of the second resource pool maps to a second subchannel of the first transmission time interval of the first resource pool.

In some examples, a first slot of the subchannel of the second resource pool maps to a subchannel of the first transmission time interval of the first resource pool, and a second slot of the subchannel of the second resource pool maps to the subchannel of the second transmission time interval of the first resource pool.

In some examples, to support receiving the feedback message, the feedback reception component 930 may be configured as or otherwise support a means for receiving the feedback message in a first portion of the first resource pool configured for feedback signaling which is frequency division multiplexed with a second portion of the first resource pool configured for sidelink control information signaling.

In some examples, to support receiving the feedback message, the feedback reception component 930 may be configured as or otherwise support a means for receiving the feedback message in a first portion of the first resource pool configured for feedback signaling which is time division multiplexed with a second portion of the first resource pool configured for sidelink control information signaling.

Additionally or alternatively, the communications manager 920 may support wireless communications at a second UE in accordance with examples as disclosed herein. The SCI reception component 940 may be configured as or otherwise support a means for receiving, from a first UE, a first sidelink control information message during a first transmission time interval of a first resource pool, the first sidelink control information message indicating a data message to be transmitted by the first UE on a sub channel of a second resource pool. The feedback transmitting component 945 may be configured as or otherwise support a means for transmitting a feedback message to the first UE for the first sidelink control information message during a second transmission time interval of the first resource pool. The data message monitoring component 950 may be configured as or otherwise support a means for determining whether to monitor for the data message on the subchannel of the second resource pool based on the feedback message.

In some examples, to support determining whether to monitor for the data message, the data message monitoring component 950 may be configured as or otherwise support a means for receiving the data message on the subchannel of the second resource pool based on the feedback message indicating an acknowledgment for the first sidelink control information message.

In some examples, to support determining whether to monitor for the data message, the SCI reception component 940 may be configured as or otherwise support a means for identifying a third transmission time interval of the first resource pool reserved by the first sidelink control information message. In some examples, to support determining whether to monitor for the data message, the SCI reception component 940 may be configured as or otherwise support a means for receiving a retransmission of the first sidelink control information message during the third transmission time interval of the first resource pool based on the feedback message indicating a negative acknowledgment, the retransmission of the first sidelink control information message indicating the data message from the first UE on a second subchannel of the second resource pool. In some examples, to support determining whether to monitor for the data message, the feedback transmitting component 945 may be configured as or otherwise support a means for transmitting a second feedback message to the first UE during a fourth transmission time interval of the first resource pool, the second feedback message indicating an acknowledgment for the retransmission of the first sidelink control information message. In some examples, to support determining whether to monitor for the data message, the data message monitoring component 950 may be configured as or otherwise support a means for receiving the data message on the second subchannel of the second resource pool based on the second feedback message.

In some examples, the resource pool RSRP component 965 may be configured as or otherwise support a means for measuring a first reference signal received power associated with the first resource pool based on the first sidelink control information message. In some examples, the resource pool RSRP component 965 may be configured as or otherwise support a means for determining a second reference signal received power associated with the second resource pool based on a mapping to the first reference signal received power.

In some examples, the SCI reception component 940 may be configured as or otherwise support a means for receiving a second sidelink control information message during the first transmission time interval of the first resource pool, where the first sidelink control information message is of a first type and the second sidelink control information message is of a second type.

In some examples, the first sidelink control information message includes a source identifier or a destination identifier, or both.

In some examples, the second sidelink control information message includes a destination identifier, a transmission configuration indicator state for the data message, a channel state information triggering state field, or any combination thereof.

In some examples, the SCI reception component 940 may be configured as or otherwise support a means for descrambling a demodulation reference signal included in the second sidelink control information message using a source identifier.

In some examples, the SCI reception component 940 may be configured as or otherwise support a means for estimating an interference level on the subchannel of the second resource pool based on the demodulation reference signal.

In some examples, the first resource pool and the second resource pool are time division multiplexed or frequency division multiplexed, or both.

In some examples, the resource pool mapping component 960 may be configured as or otherwise support a means for receiving an indication of a mapping between the first resource pool and the second resource pool based on a first subcarrier spacing for the first resource pool and a second subcarrier spacing for the second resource pool.

In some examples, a first slot of the subchannel of the second resource pool maps to a first subchannel of the first transmission time interval of the first resource pool, and a second slot of the subchannel of the second resource pool maps to a second subchannel of the first transmission time interval of the first resource pool.

In some examples, a first slot of the subchannel of the second resource pool maps to a subchannel of the first transmission time interval of the first resource pool, and a second slot of the subchannel of the second resource pool maps to the subchannel of the second transmission time interval of the first resource pool.

In some examples, to support transmitting the feedback message, the feedback transmitting component 945 may be configured as or otherwise support a means for transmitting the feedback message in a first portion of the first resource pool configured for feedback signaling which is frequency division multiplexed with a second portion of the first resource pool configured for sidelink control information signaling.

In some examples, to support transmitting the feedback message, the feedback transmitting component 945 may be configured as or otherwise support a means for transmitting the feedback message in a first portion of the first resource pool configured for feedback signaling which is time division multiplexed with a second portion of the first resource pool configured for sidelink control information signaling.

Figure 10:
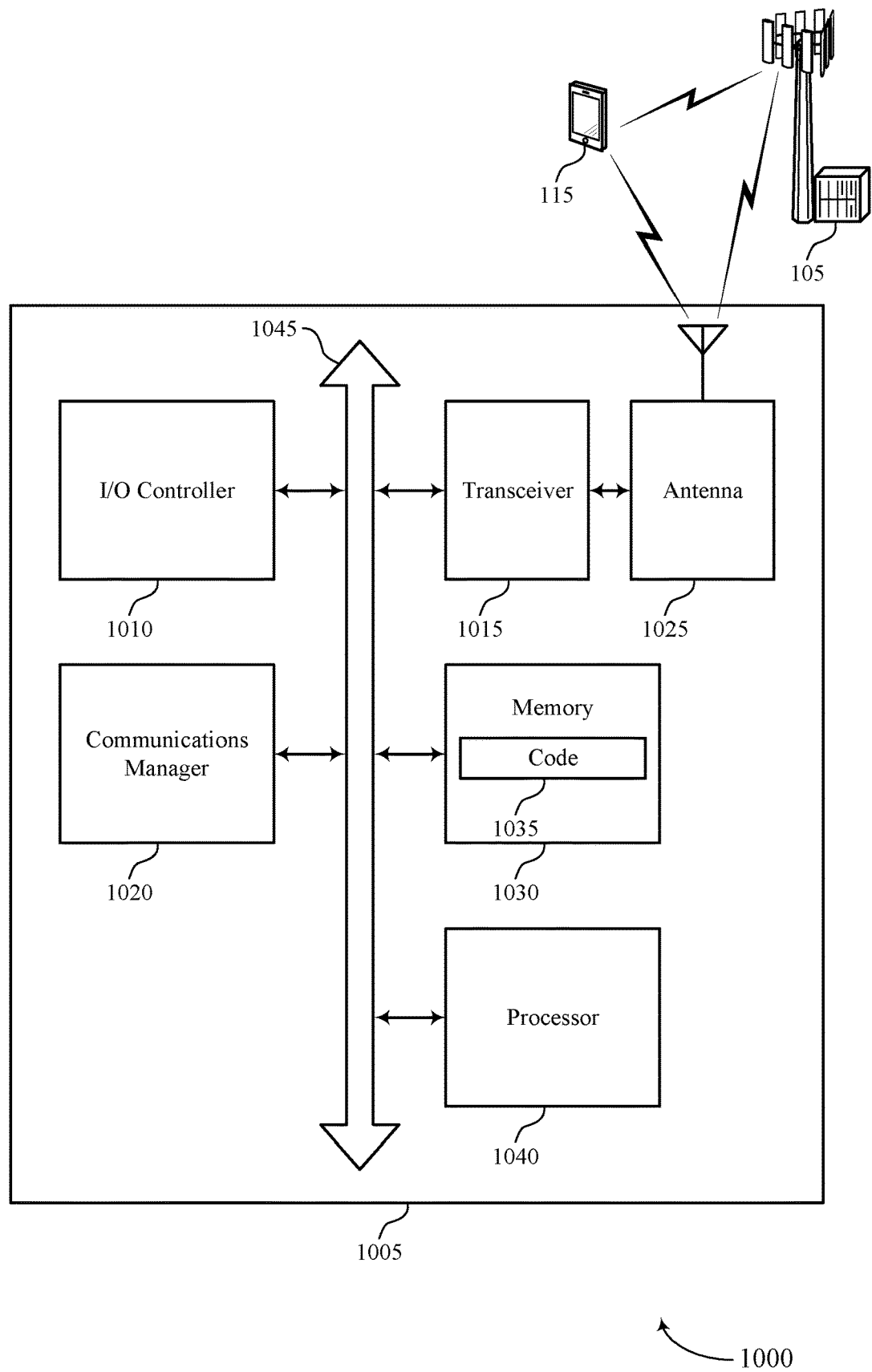
FIG. 10 shows a diagram of a system including a device that supports techniques for control resource pool-gated data transmission in accordance with aspects of the present disclosure.

FIG. 10 shows a diagram of a system 1000 including a device 1005 that supports techniques for control resource pool-gated data transmission in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for control resource pool-gated data transmission). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for transmitting a first sidelink control information message during a first transmission time interval of a first resource pool, the first sidelink control information message indicating a data message to be transmitted on a subchannel of a second resource pool to a second UE. The communications manager 1020 may be configured as or otherwise support a means for receiving a feedback message from the second UE for the first sidelink control information message during a second transmission time interval of the first resource pool. The communications manager 1020 may be configured as or otherwise support a means for determining whether to transmit the data message on the subchannel of the second resource pool based on the feedback message received from the second UE.

Additionally or alternatively, the communications manager 1020 may support wireless communications at a second UE in accordance with examples as disclosed herein. For example, the communications manager 1020 may be configured as or otherwise support a means for receiving, from a first UE, a first sidelink control information message during a first transmission time interval of a first resource pool, the first sidelink control information message indicating a data message to be transmitted by the first UE on a subchannel of a second resource pool. The communications manager 1020 may be configured as or otherwise support a means for transmitting a feedback message to the first UE for the first sidelink control information message during a second transmission time interval of the first resource pool. The communications manager 1020 may be configured as or otherwise support a means for determining whether to monitor for the data message on the subchannel of the second resource pool based on the feedback message.

By including or configuring the communications manager 1020 in accordance with examples as described herein, the device 1005 may support techniques for reduced latency and improved communication reliability. For example, by gating a data transmission which may result in a collision in a data resource pool, a UE 115 may sooner reschedule the data transmission by retransmitting a first-stage SCI instead of waiting for HARQ feedback for the data transmission.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for control resource pool-gated data transmission as described herein, or the processor 1040 and the memory 1030 may be otherwise configured to perform or support such operations.

Figure 11:
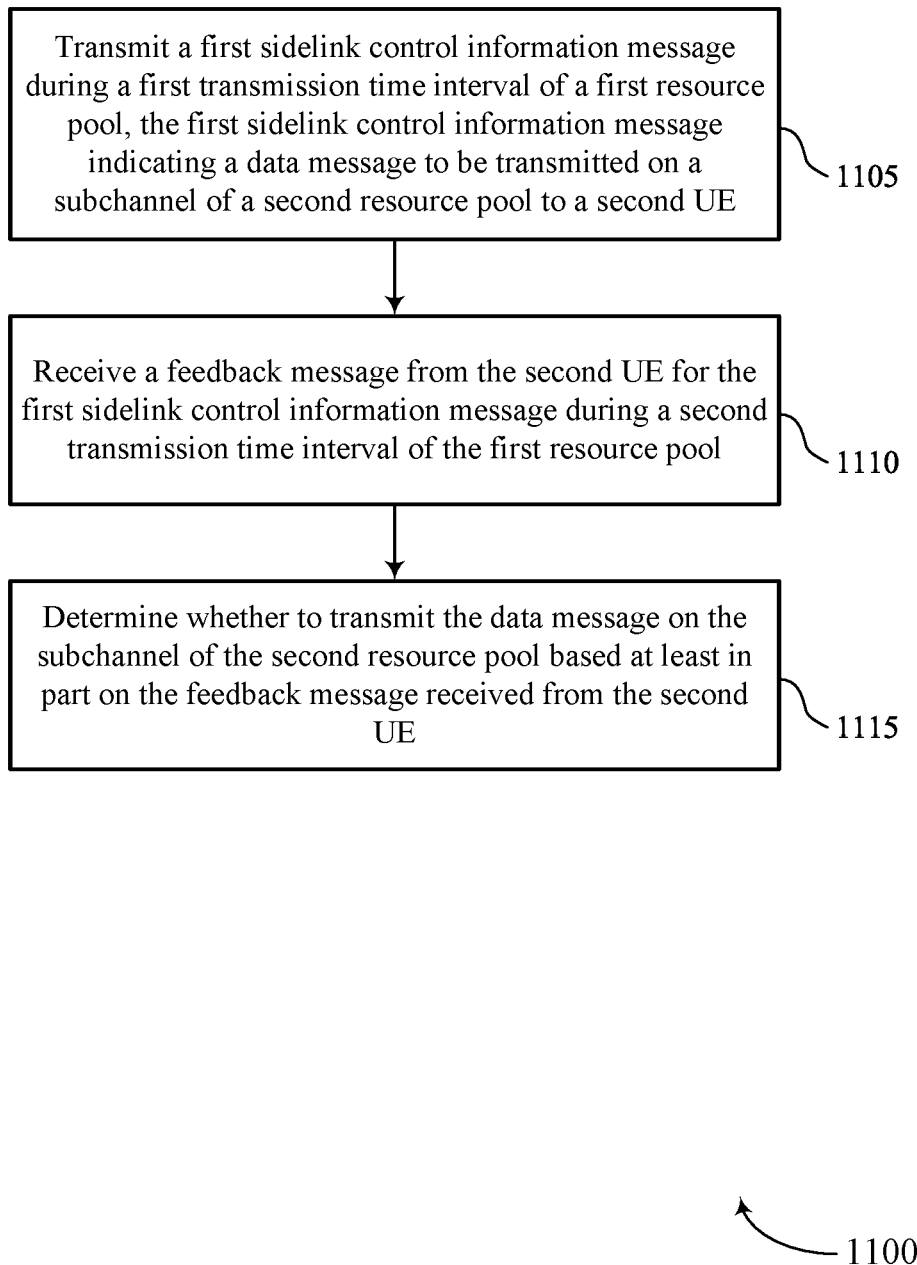
FIGS. 11 through 15 show flowcharts illustrating methods that support techniques for control resource pool-gated data transmission in accordance with aspects of the present disclosure.

FIG. 11 shows a flowchart illustrating a method 1100 that supports techniques for control resource pool-gated data transmission in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include transmitting a first sidelink control information message during a first transmission time interval of a first resource pool, the first sidelink control information message indicating a data message to be transmitted on a subchannel of a second resource pool to a second UE. The operations of 1105 may be performed in accordance with examples as disclosed herein. In some examples, aspects of the operations of 1105 may be performed by an SCI transmitting component 925 as described with reference to FIG. 9.

At 1110, the method may include receiving a feedback message from the second UE for the first sidelink control information message during a second transmission time interval of the first resource pool. The operations of 1110 may be performed in accordance with examples as disclosed herein. In some examples, aspects of the operations of 1110 may be performed by a feedback reception component 930 as described with reference to FIG. 9.

At 1115, the method may include determining whether to transmit the data message on the subchannel of the second resource pool based on the feedback message received from the second UE. The operations of 1115 may be performed in accordance with examples as disclosed herein. In some examples, aspects of the operations of 1115 may be performed by a data message transmission component 935 as described with reference to FIG. 9.

Figure 12:
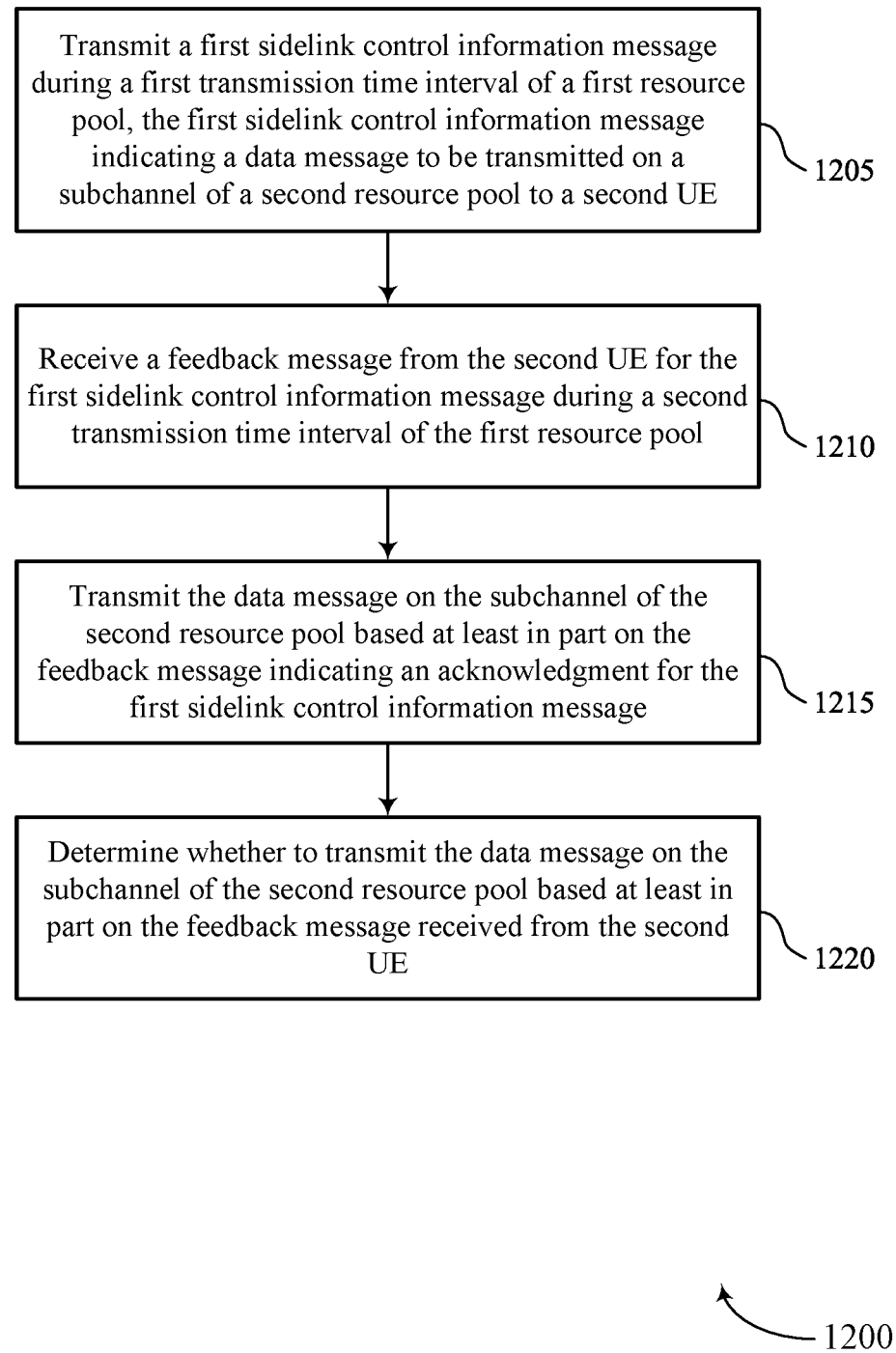

FIG. 12 shows a flowchart illustrating a method 1200 that supports techniques for control resource pool-gated data transmission in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include transmitting a first sidelink control information message during a first transmission time interval of a first resource pool, the first sidelink control information message indicating a data message to be transmitted on a subchannel of a second resource pool to a second UE. The operations of 1205 may be performed in accordance with examples as disclosed herein. In some examples, aspects of the operations of 1205 may be performed by an SCI transmitting component 925 as described with reference to FIG. 9.

At 1210, the method may include receiving a feedback message from the second UE for the first sidelink control information message during a second transmission time interval of the first resource pool. The operations of 1210 may be performed in accordance with examples as disclosed herein. In some examples, aspects of the operations of 1210 may be performed by a feedback reception component 930 as described with reference to FIG. 9.

At 1215, the method may include transmitting the data message on the subchannel of the second resource pool based on the feedback message indicating an acknowledgment for the first sidelink control information message. The operations of 1215 may be performed in accordance with examples as disclosed herein. In some examples, aspects of the operations of 1215 may be performed by a data message transmission component 935 as described with reference to FIG. 9.

At 1220, the method may include determining whether to transmit the data message on the subchannel of the second resource pool based on the feedback message received from the second UE. The operations of 1220 may be performed in accordance with examples as disclosed herein. In some examples, aspects of the operations of 1220 may be performed by a data message transmission component 935 as described with reference to FIG. 9.

Figure 13:
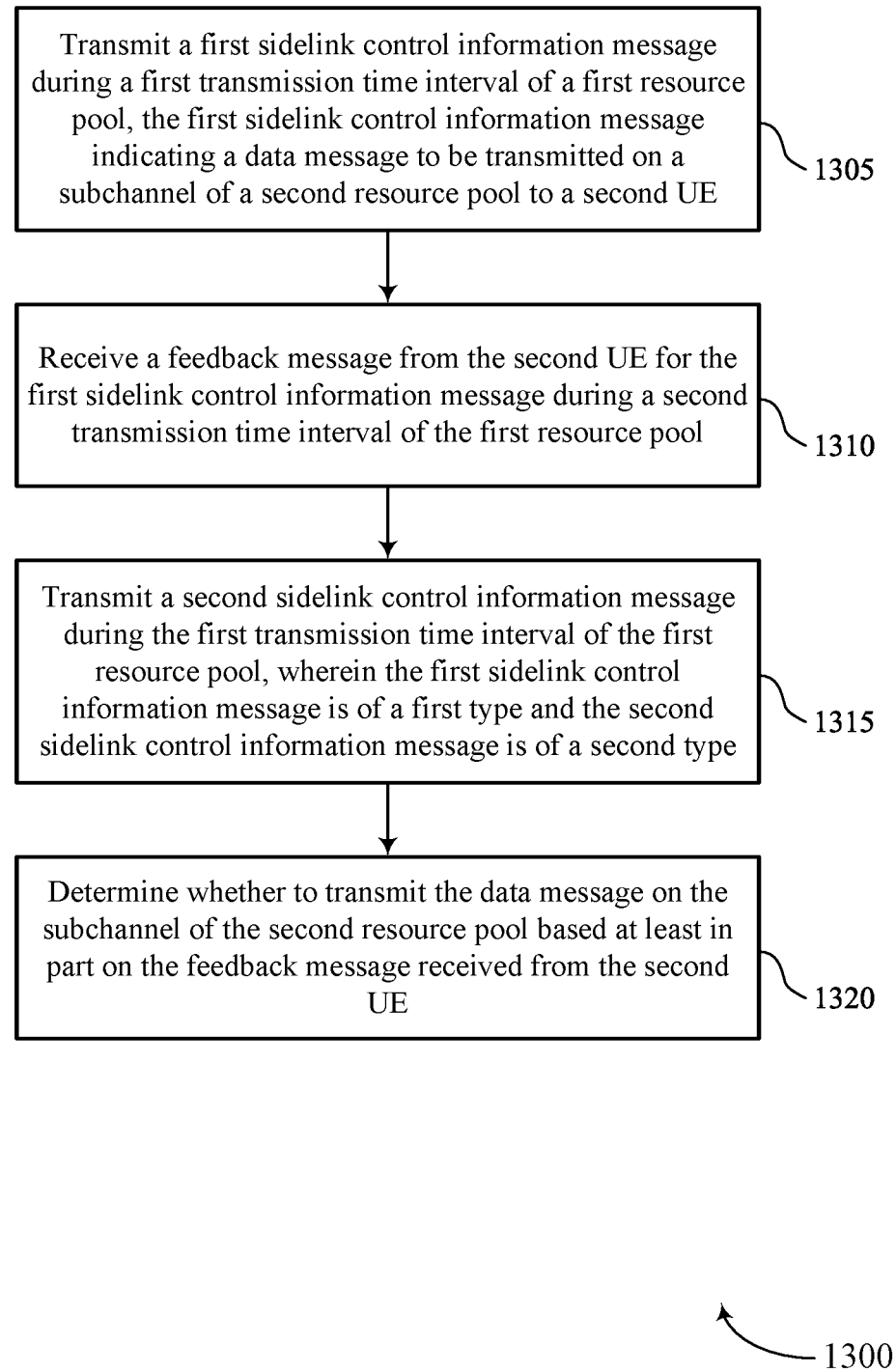

FIG. 13 shows a flowchart illustrating a method 1300 that supports techniques for control resource pool-gated data transmission in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include transmitting a first sidelink control information message during a first transmission time interval of a first resource pool, the first sidelink control information message indicating a data message to be transmitted on a subchannel of a second resource pool to a second UE. The operations of 1305 may be performed in accordance with examples as disclosed herein. In some examples, aspects of the operations of 1305 may be performed by an SCI transmitting component 925 as described with reference to FIG. 9.

At 1310, the method may include receiving a feedback message from the second UE for the first sidelink control information message during a second transmission time interval of the first resource pool. The operations of 1310 may be performed in accordance with examples as disclosed herein. In some examples, aspects of the operations of 1310 may be performed by a feedback reception component 930 as described with reference to FIG. 9.

At 1315, the method may include transmitting a second sidelink control information message during the first transmission time interval of the first resource pool, where the first sidelink control information message is of a first type and the second sidelink control information message is of a second type. The operations of 1315 may be performed in accordance with examples as disclosed herein. In some examples, aspects of the operations of 1315 may be performed by an SCI transmitting component 925 as described with reference to FIG. 9.

At 1320, the method may include determining whether to transmit the data message on the subchannel of the second resource pool based on the feedback message received from the second UE. The operations of 1320 may be performed in accordance with examples as disclosed herein. In some examples, aspects of the operations of 1320 may be performed by a data message transmission component 935 as described with reference to FIG. 9.

Figure 14:
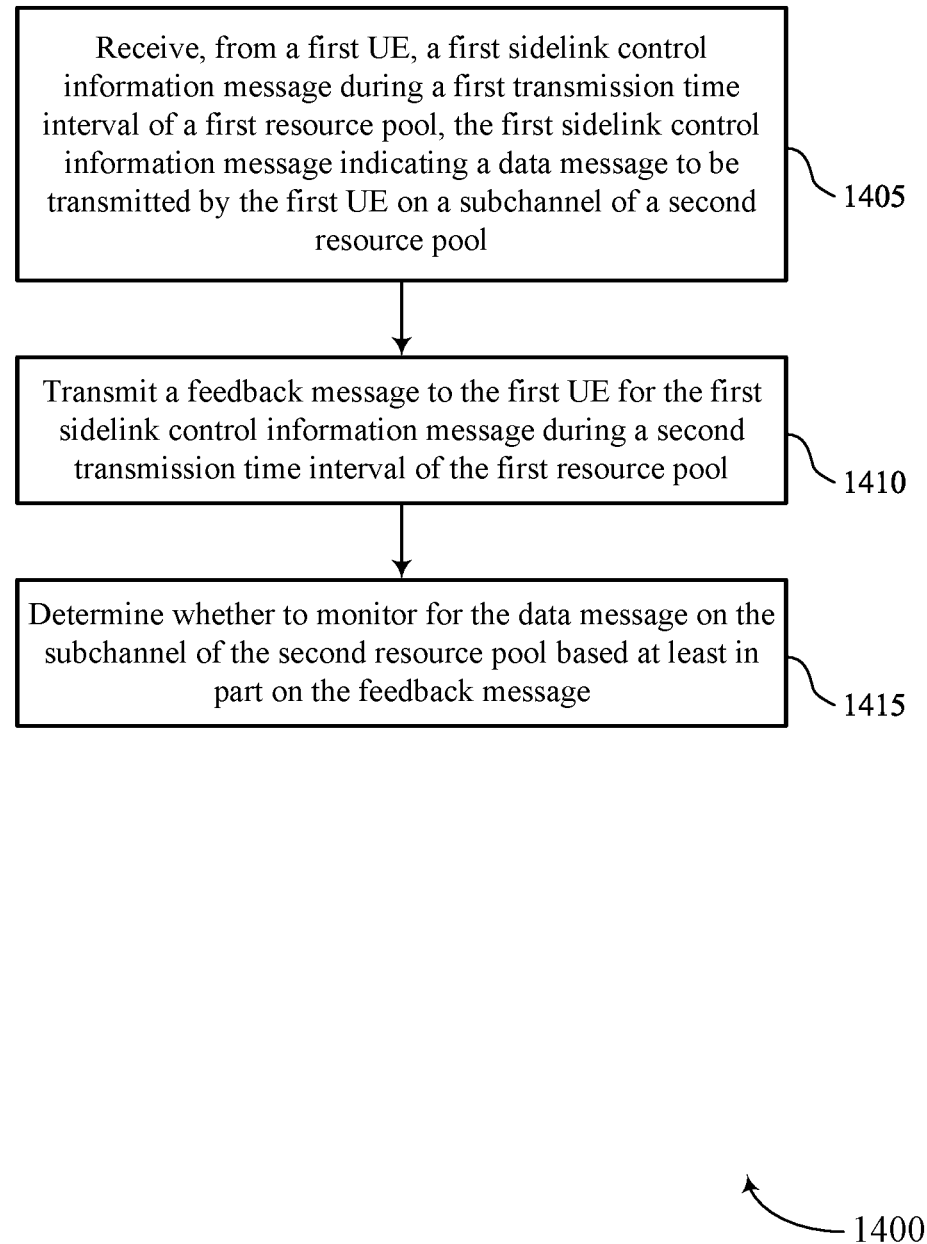

FIG. 14 shows a flowchart illustrating a method 1400 that supports techniques for control resource pool-gated data transmission in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving, from a first UE, a first sidelink control information message during a first transmission time interval of a first resource pool, the first sidelink control information message indicating a data message to be transmitted by the first UE on a subchannel of a second resource pool. The operations of 1405 may be performed in accordance with examples as disclosed herein. In some examples, aspects of the operations of 1405 may be performed by an SCI reception component 940 as described with reference to FIG. 9.

At 1410, the method may include transmitting a feedback message to the first UE for the first sidelink control information message during a second transmission time interval of the first resource pool. The operations of 1410 may be performed in accordance with examples as disclosed herein. In some examples, aspects of the operations of 1410 may be performed by a feedback transmitting component 945 as described with reference to FIG. 9.

At 1415, the method may include determining whether to monitor for the data message on the subchannel of the second resource pool based on the feedback message. The operations of 1415 may be performed in accordance with examples as disclosed herein. In some examples, aspects of the operations of 1415 may be performed by a data message monitoring component 950 as described with reference to FIG. 9.

Figure 15:
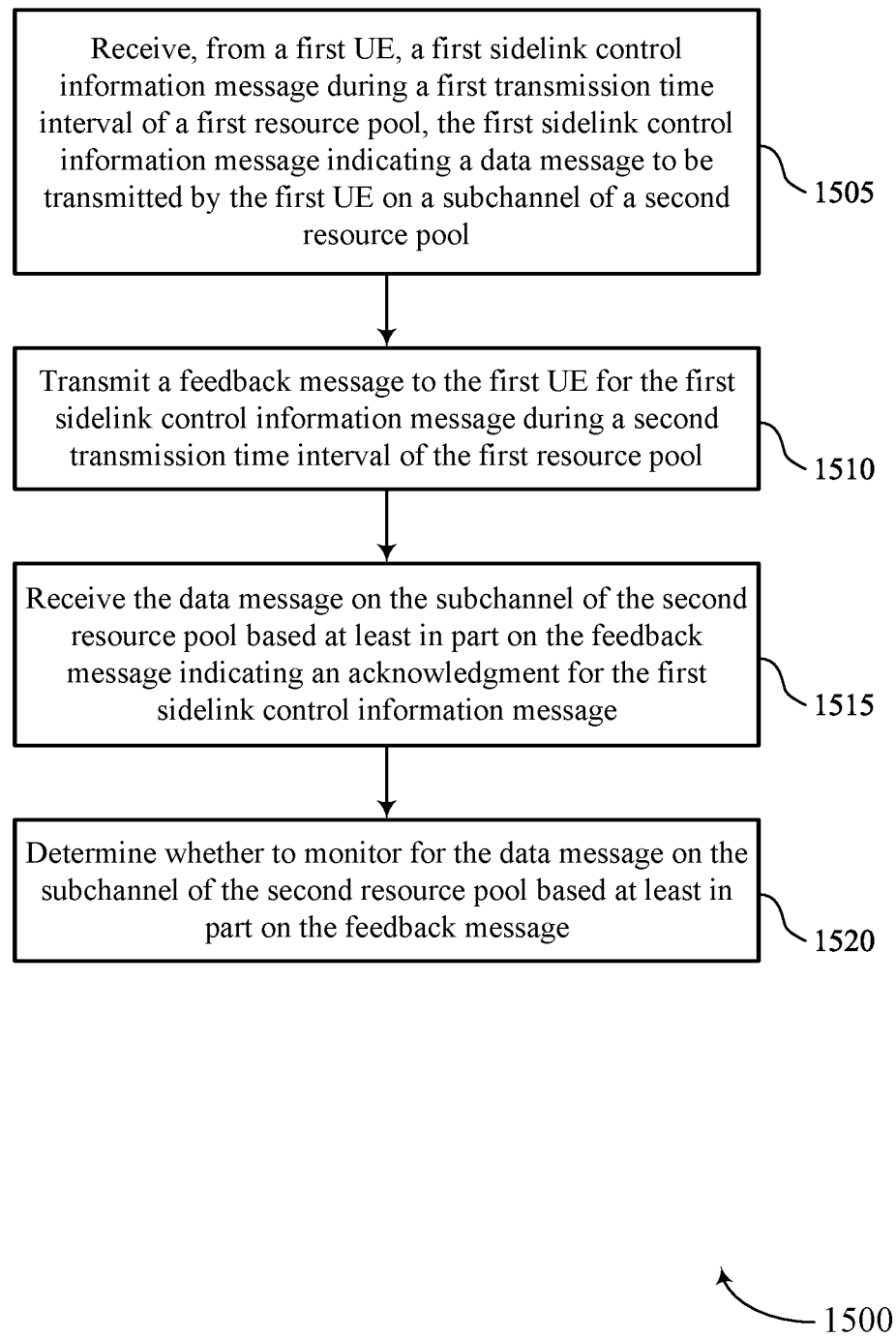

FIG. 15 shows a flowchart illustrating a method 1500 that supports techniques for control resource pool-gated data transmission in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a first UE, a first sidelink control information message during a first transmission time interval of a first resource pool, the first sidelink control information message indicating a data message to be transmitted by the first UE on a subchannel of a second resource pool. The operations of 1505 may be performed in accordance with examples as disclosed herein. In some examples, aspects of the operations of 1505 may be performed by an SCI reception component 940 as described with reference to FIG. 9.

At 1510, the method may include transmitting a feedback message to the first UE for the first sidelink control information message during a second transmission time interval of the first resource pool. The operations of 1510 may be performed in accordance with examples as disclosed herein. In some examples, aspects of the operations of 1510 may be performed by a feedback transmitting component 945 as described with reference to FIG. 9.

At 1515, the method may include receiving the data message on the subchannel of the second resource pool based on the feedback message indicating an acknowledgment for the first sidelink control information message. The operations of 1515 may be performed in accordance with examples as disclosed herein. In some examples, aspects of the operations of 1515 may be performed by a data message monitoring component 950 as described with reference to FIG. 9.

At 1520, the method may include determining whether to monitor for the data message on the subchannel of the second resource pool based on the feedback message. The operations of 1520 may be performed in accordance with examples as disclosed herein. In some examples, aspects of the operations of 1520 may be performed by a data message monitoring component 950 as described with reference to FIG. 9.

The following provides an overview of aspects of the present disclosure:

Aspect 1: A method for wireless communications at a first UE, comprising: transmitting a first sidelink control information message during a first transmission time interval of a first resource pool, the first sidelink control information message indicating a data message to be transmitted on a subchannel of a second resource pool to a second UE; receiving a feedback message from the second UE for the first sidelink control information message during a second transmission time interval of the first resource pool; determining whether to transmit the data message on the subchannel of the second resource pool based at least in part on the feedback message received from the second UE.

Aspect 2: The method of aspect 1, wherein determining whether to transmit the data message comprises: transmitting the data message on the subchannel of the second resource pool based at least in part on the feedback message indicating an acknowledgment for the first sidelink control information message.

Aspect 3: The method of any of aspects 1 through 2, wherein determining whether to transmit the data message comprises: reserving, based at least in part on transmitting the first sidelink control information message, a third transmission time interval of the first resource pool; transmitting a retransmission of the first sidelink control information message during the third transmission time interval of the first resource pool based at least in part on the feedback message indicating a negative acknowledgment, the retransmission of the first sidelink control information message indicating the data message to be transmitted on a second subchannel of the second resource pool the second UE; receiving a second feedback message from the second UE during a fourth transmission time interval of the first resource pool, the second feedback message indicating an acknowledgment for the retransmission of the first sidelink control information message; and transmitting the data message on the second subchannel of the second resource pool based at least in part on the second feedback message.

Aspect 4: The method of any of aspects 1 through 3, further comprising: transmitting a second sidelink control information message during the first transmission time interval of the first resource pool, wherein the first sidelink control information message is of a first type and the second sidelink control information message is of a second type.

Aspect 5: The method of aspect 4, wherein the first sidelink control information message includes a source identifier or a destination identifier, or both.

Aspect 6: The method of any of aspects 4 through 5, wherein the second sidelink control information message includes a destination identifier, a transmission configuration indicator state for the data message, a channel state information triggering state field, or any combination thereof.

Aspect 7: The method of any of aspects 4 through 6, further comprising: scrambling a demodulation reference signal included in the second sidelink control information message using a source identifier.

Aspect 8: The method of any of aspects 1 through 7, wherein the first resource pool and the second resource pool are time division multiplexed or frequency division multiplexed, or both.

Aspect 9: The method of any of aspects 1 through 8, further comprising: receiving an indication of a mapping between the first resource pool and the second resource pool based at least in part on a first subcarrier spacing for the first resource pool and a second subcarrier spacing for the second resource pool.

Aspect 10: The method of aspect 9, wherein a first slot of the subchannel of the second resource pool maps to a first subchannel of the first transmission time interval of the first resource pool, and a second slot of the subchannel of the second resource pool maps to a second subchannel of the first transmission time interval of the first resource pool.

Aspect 11: The method of any of aspects 9 through 10, wherein a first slot of the subchannel of the second resource pool maps to a subchannel of the first transmission time interval of the first resource pool, and a second slot of the subchannel of the second resource pool maps to the subchannel of the second transmission time interval of the first resource pool.

Aspect 12: The method of any of aspects 1 through 11, wherein receiving the feedback message comprises: receiving the feedback message in a first portion of the first resource pool configured for feedback signaling which is frequency division multiplexed with a second portion of the first resource pool configured for sidelink control information signaling.

Aspect 13: The method of any of aspects 1 through 12, wherein receiving the feedback message comprises: receiving the feedback message in a first portion of the first resource pool configured for feedback signaling which is time division multiplexed with a second portion of the first resource pool configured for sidelink control information signaling.

Aspect 14: A method for wireless communications at a second UE, comprising: receiving, from a first UE, a first sidelink control information message during a first transmission time interval of a first resource pool, the first sidelink control information message indicating a data message to be transmitted by the first UE on a subchannel of a second resource pool; transmitting a feedback message to the first UE for the first sidelink control information message during a second transmission time interval of the first resource pool; determining whether to monitor for the data message on the subchannel of the second resource pool based at least in part on the feedback message.

Aspect 15: The method of aspect 14, wherein determining whether to monitor for the data message comprises: receiving the data message on the subchannel of the second resource pool based at least in part on the feedback message indicating an acknowledgment for the first sidelink control information message.

Aspect 16: The method of any of aspects 14 through 15, wherein determining whether to monitor for the data message comprises: identifying a third transmission time interval of the first resource pool reserved by the first sidelink control information message; receiving a retransmission of the first sidelink control information message during the third transmission time interval of the first resource pool based at least in part on the feedback message indicating a negative acknowledgment, the retransmission of the first sidelink control information message indicating the data message from the first UE on a second subchannel of the second resource pool; transmitting a second feedback message to the first UE during a fourth transmission time interval of the first resource pool, the second feedback message indicating an acknowledgment for the retransmission of the first sidelink control information message; and receiving the data message on the second subchannel of the second resource pool based at least in part on the second feedback message.

Aspect 17: The method of any of aspects 14 through 16, further comprising: measuring a first reference signal received power associated with the first resource pool based at least in part on the first sidelink control information message; and determining a second reference signal received power associated with the second resource pool based at least in part on a mapping to the first reference signal received power.

Aspect 18: The method of any of aspects 14 through 17, further comprising: receiving a second sidelink control information message during the first transmission time interval of the first resource pool, wherein the first sidelink control information message is of a first type and the second sidelink control information message is of a second type.

Aspect 19: The method of aspect 18, wherein the first sidelink control information message includes a source identifier or a destination identifier, or both.

Aspect 20: The method of any of aspects 18 through 19, wherein the second sidelink control information message includes a destination identifier, a transmission configuration indicator state for the data message, a channel state information triggering state field, or any combination thereof.

Aspect 21: The method of any of aspects 18 through 20, further comprising: descrambling a demodulation reference signal included in the second sidelink control information message using a source identifier.

Aspect 22: The method of aspect 21, further comprising: estimating an interference level on the subchannel of the second resource pool based at least in part on the demodulation reference signal.

Aspect 23: The method of any of aspects 14 through 22, wherein the first resource pool and the second resource pool are time division multiplexed or frequency division multiplexed, or both.

Aspect 24: The method of any of aspects 14 through 23, further comprising: receiving an indication of a mapping between the first resource pool and the second resource pool based at least in part on a first subcarrier spacing for the first resource pool and a second subcarrier spacing for the second resource pool.

Aspect 25: The method of aspect 24, wherein a first slot of the subchannel of the second resource pool maps to a first subchannel of the first transmission time interval of the first resource pool, and a second slot of the subchannel of the second resource pool maps to a second subchannel of the first transmission time interval of the first resource pool.

Aspect 26: The method of any of aspects 24 through 25, wherein a first slot of the subchannel of the second resource pool maps to a subchannel of the first transmission time interval of the first resource pool, and a second slot of the subchannel of the second resource pool maps to the subchannel of the second transmission time interval of the first resource pool.

Aspect 27: The method of any of aspects 14 through 26, wherein transmitting the feedback message comprises: transmitting the feedback message in a first portion of the first resource pool configured for feedback signaling which is frequency division multiplexed with a second portion of the first resource pool configured for sidelink control information signaling.

Aspect 28: The method of any of aspects 14 through 27, wherein transmitting the feedback message comprises: transmitting the feedback message in a first portion of the first resource pool configured for feedback signaling which is time division multiplexed with a second portion of the first resource pool configured for sidelink control information signaling.

Aspect 29: An apparatus for wireless communications at a first UE, comprising a processor; memory coupled with the processor; and instructions stored in the memory and executable by the processor to cause the apparatus to perform a method of any of aspects 1 through 13.

Aspect 30: An apparatus for wireless communications at a first UE, comprising at least one means for performing a method of any of aspects 1 through 13.

Aspect 31: A non-transitory computer-readable medium storing code for wireless communications at a first UE, the code comprising instructions executable by a processor to perform a method of any of aspects 1 through 13.

Aspect 32: An apparatus for wireless communications at a second UE, comprising a processor; memory coupled with the processor; and instructions stored in the memory and executable by the processor to cause the apparatus to perform a method of any of aspects 14 through 28.

Aspect 33: An apparatus for wireless communications at a second UE, comprising at least one means for performing a method of any of aspects 14 through 28.

Aspect 34: A non-transitory computer-readable medium storing code for wireless communications at a second UE, the code comprising instructions executable by a processor to perform a method of any of aspects 14 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
    one or more memories storing processor-executable code; and
    one or more processors coupled with the one or more memories and individually or collectively operable to execute the code to cause the apparatus to:
        transmit a first sidelink control information message during a first transmission time interval of a first resource pool, the first sidelink control information message indicating a data message to be transmitted on a subchannel of a second resource pool to a second UE;
        receive a feedback message from the second UE for the first sidelink control information message during a second transmission time interval of the first resource pool;
        determine whether to transmit the data message on the subchannel of the second resource pool based at least in part on the feedback message received from the second UE;
        reserve, based at least in part on transmitting the first sidelink control information message, a third transmission time interval of the first resource pool;
        transmit a retransmission of the first sidelink control information message during the third transmission time interval of the first resource pool based at least in part on the feedback message indicating a negative acknowledgment, the retransmission of the first sidelink control information message indicating the data message to be transmitted on a second subchannel of the second resource pool to the second UE;
        receive a second feedback message from the second UE during a fourth transmission time interval of the first resource pool, the second feedback message indicating an acknowledgment for the retransmission of the first sidelink control information message; and
        transmit the data message on the second subchannel of the second resource pool based at least in part on the second feedback message.

2. The apparatus of claim 1, wherein the instructions to determine whether to transmit the data message are executable by the processor to cause the apparatus to:
    transmit the data message on the subchannel of the second resource pool based at least in part on the feedback message indicating an acknowledgment for the first sidelink control information message.

3. The apparatus of claim 1, wherein the instructions are further executable by the processor to cause the apparatus to:
    transmit a second sidelink control information message during the first transmission time interval of the first resource pool, wherein the first sidelink control information message is of a first type and the second sidelink control information message is of a second type.

4. The apparatus of claim 3, wherein the first sidelink control information message includes a source identifier or a destination identifier, or both.

5. The apparatus of claim 3, wherein the second sidelink control information message includes a destination identifier, a transmission configuration indicator state for the data message, a channel state information triggering state field, or any combination thereof.

6. The apparatus of claim 3, wherein the instructions are further executable by the processor to cause the apparatus to:
    scramble a demodulation reference signal included in the second sidelink control information message using a source identifier.

7. The apparatus of claim 1, wherein the first resource pool and the second resource pool are time division multiplexed or frequency division multiplexed, or both.

8. The apparatus of claim 1, wherein the instructions are further executable by the processor to cause the apparatus to:
    receive an indication of a mapping between the first resource pool and the second resource pool based at least in part on a first subcarrier spacing for the first resource pool and a second subcarrier spacing for the second resource pool.

9. The apparatus of claim 8, wherein:
    a first slot of the subchannel of the second resource pool maps to a first subchannel of the first transmission time interval of the first resource pool, and a second slot of the subchannel of the second resource pool maps to a second subchannel of the first transmission time interval of the first resource pool.

10. The apparatus of claim 8, wherein:
    a first slot of the subchannel of the second resource pool maps to a subchannel of the first transmission time interval of the first resource pool, and a second slot of the subchannel of the second resource pool maps to the subchannel of the second transmission time interval of the first resource pool.

11. The apparatus of claim 1, wherein the instructions to receive the feedback message are executable by the processor to cause the apparatus to:
    receive the feedback message in a first portion of the first resource pool configured for feedback signaling which is frequency division multiplexed with a second portion of the first resource pool configured for sidelink control information signaling.

12. The apparatus of claim 1, wherein the instructions to receive the feedback message are executable by the processor to cause the apparatus to:
    receive the feedback message in a first portion of the first resource pool configured for feedback signaling which is time division multiplexed with a second portion of the first resource pool configured for sidelink control information signaling.

13. An apparatus for wireless communications at a second user equipment (UE), comprising:
    one or more memories storing processor-executable code; and
    one or more processors coupled with the one or more memories and individually or collectively operable to execute the code to cause the apparatus to:

receive, from a first UE, a first sidelink control information message during a first transmission time interval of a first resource pool, the first sidelink control information message indicating a data message to be transmitted by the first UE on a subchannel of a second resource pool;

transmit a feedback message to the first UE for the first sidelink control information message during a second transmission time interval of the first resource pool;

determine whether to monitor for the data message on the subchannel of the second resource pool based at least in part on the feedback message;

identify a third transmission time interval of the first resource pool reserved by the first sidelink control information message;

receive a retransmission of the first sidelink control information message during the third transmission time interval of the first resource pool based at least in part on the feedback message indicating a negative acknowledgment, the retransmission of the first sidelink control information message indicating the data message from the first UE on a second subchannel of the second resource pool;

transmit a second feedback message to the first UE during a fourth transmission time interval of the first resource pool, the second feedback message indicating an acknowledgment for the retransmission of the first sidelink control information message; and receive the data message on the second subchannel of the second resource pool based at least in part on the second feedback message.

14. The apparatus of claim 13, wherein the instructions to determine whether to monitor for the data message are executable by the processor to cause the apparatus to:

receive the data message on the subchannel of the second resource pool based at least in part on the feedback message indicating an acknowledgment for the first sidelink control information message.

15. The apparatus of claim 13, wherein the instructions are further executable by the processor to cause the apparatus to:

measure a first reference signal received power associated with the first resource pool based at least in part on the first sidelink control information message; and determine a second reference signal received power associated with the second resource pool based at least in part on a mapping to the first reference signal received power.

16. The apparatus of claim 13, wherein the instructions are further executable by the processor to cause the apparatus to:

receive a second sidelink control information message during the first transmission time interval of the first resource pool, wherein the first sidelink control information message is of a first type and the second sidelink control information message is of a second type.

17. The apparatus of claim 16, wherein the first sidelink control information message includes a source identifier or a destination identifier, or both.

18. The apparatus of claim 16, wherein the second sidelink control information message includes a destination identifier, a transmission configuration indicator state for the data message, a channel state information triggering state field, or any combination thereof.

19. The apparatus of claim 16, wherein the instructions are further executable by the processor to cause the apparatus to:

descramble a demodulation reference signal included in the second sidelink control information message using a source identifier.

20. The apparatus of claim 19, wherein the instructions are further executable by the processor to cause the apparatus to:

estimate an interference level on the subchannel of the second resource pool based at least in part on the demodulation reference signal.

21. The apparatus of claim 13, wherein the first resource pool and the second resource pool are time division multiplexed or frequency division multiplexed, or both.

22. The apparatus of claim 13, wherein the instructions are further executable by the processor to cause the apparatus to:

receive an indication of a mapping between the first resource pool and the second resource pool based at least in part on a first subcarrier spacing for the first resource pool and a second subcarrier spacing for the second resource pool.

23. The apparatus of claim 22, wherein:

a first slot of the subchannel of the second resource pool maps to a first subchannel of the first transmission time interval of the first resource pool, and a second slot of the subchannel of the second resource pool maps to a second subchannel of the first transmission time interval of the first resource pool.

24. The apparatus of claim 22, wherein:

a first slot of the subchannel of the second resource pool maps to a subchannel of the first transmission time interval of the first resource pool, and a second slot of the subchannel of the second resource pool maps to the subchannel of the second transmission time interval of the first resource pool.

25. The apparatus of claim 13, wherein the instructions to transmit the feedback message are executable by the processor to cause the apparatus to:

transmit the feedback message in a first portion of the first resource pool configured for feedback signaling which is frequency division multiplexed with a second portion of the first resource pool configured for sidelink control information signaling.

26. The apparatus of claim 13, wherein the instructions to transmit the feedback message are executable by the processor to cause the apparatus to:

transmit the feedback message in a first portion of the first resource pool configured for feedback signaling which is time division multiplexed with a second portion of the first resource pool configured for sidelink control information signaling.

27. A method for wireless communications at a first user equipment (UE), comprising:

transmitting a first sidelink control information message during a first transmission time interval of a first resource pool, the first sidelink control information message indicating a data message to be transmitted on a subchannel of a second resource pool to a second UE;

receiving a feedback message from the second UE for the first sidelink control information message during a second transmission time interval of the first resource pool;

determining whether to transmit the data message on the subchannel of the second resource pool based at least in part on the feedback message received from the second UE;

reserving, based at least in part on transmitting the first sidelink control information message, a third transmission time interval of the first resource pool;

transmitting a retransmission of the first sidelink control information message during the third transmission time interval of the first resource pool based at least in part on the feedback message indicating a negative acknowledgment, the retransmission of the first sidelink control information message indicating the data message to be transmitted on a second subchannel of the second resource pool to the second UE;

receiving a second feedback message from the second UE during a fourth transmission time interval of the first resource pool, the second feedback message indicating an acknowledgment for the retransmission of the first sidelink control information message; and transmitting the data message on the second subchannel of the second resource pool based at least in part on the second feedback message.

28. A method for wireless communications at a second user equipment (UE), comprising:

receiving, from a first UE, a first sidelink control information message during a first transmission time interval of a first resource pool, the first sidelink control information message indicating a data message to be transmitted by the first UE on a subchannel of a second resource pool;

transmitting a feedback message to the first UE for the first sidelink control information message during a second transmission time interval of the first resource pool;

determining whether to monitor for the data message on the subchannel of the second resource pool based at least in part on the feedback message;

identifying a third transmission time interval of the first resource pool reserved by the first sidelink control information message;

receiving a retransmission of the first sidelink control information message during the third transmission time interval of the first resource pool based at least in part on the feedback message indicating a negative acknowledgment, the retransmission of the first sidelink control information message indicating the data message from the first UE on a second subchannel of the second resource pool;

transmitting a second feedback message to the first UE during a fourth transmission time interval of the first resource pool, the second feedback message indicating an acknowledgment for the retransmission of the first sidelink control information message; and receiving the data message on the second subchannel of the second resource pool based at least in part on the second feedback message.

* * * * *